US012711255B2

United States Patent

(12) Hu et al.

(10) Patent No.: US 12,711,255 B2

(45) Date of Patent: Aug. 18, 2026

(54) DATA LOSS PROTECTION (DLP) UTILIZING DISTILLED LARGE LANGUAGE MODELS (LLMs)

(71) Applicant: Zscaler, Inc., San Jose, CA (US)

(72) Inventors: Chenhui Hu, Boston, MA (US); Kabir Nagpal, Bengaluru (IN); Arun Bhallamudi, Santa Clara, CA (US)

(73) Assignee: Zscaler, Inc., San Jose, CA (US)

( * ) Notice: Subject to any disclaimer, the term of this patent is extended or adjusted under 35 U.S.C. 154(b) by 75 days.

(21) Appl. No.: 18/745,555

(22) Filed: Jun. 17, 2024

(65) Prior Publication Data

US 2025/0225260 A1 Jul. 10, 2025

Related U.S. Application Data

(63) Continuation-in-part of application No. 18/735,880, filed on Jun. 6, 2024, which is a continuation-in-part of application No. 18/584,354, filed on Feb. 22, 2024.

(30) Foreign Application Priority Data

Jan. 10, 2024 (IN) ............................ 202441001852

(51) Int. Cl.
*G06F 21/62* (2013.01)

(52) U.S. Cl.
CPC .................................. *G06F 21/62* (2013.01)

(58) Field of Classification Search
CPC ............................................. G06F 21/60–629
See application file for complete search history.

(56) References Cited

U.S. PATENT DOCUMENTS 7,253,606 B2 8/2007 Loh et al.
7,984,102 B1 7/2011 Raphel et al.
8,205,187 B1 6/2012 Coelho et al.
(Continued)

FOREIGN PATENT DOCUMENTS

BR 0001075 A 11/2001
BR 8203135 U 10/2004
(Continued)

OTHER PUBLICATIONS

Zhou, Tianxun, and Keng-Hwee Chiam. “Synthetic data generation method for data-free knowledge distillation in regression neural networks.” Expert Systems with Applications 227 (2023): 120327. (Year: 2023).*

*Primary Examiner* — Madhuri R Herzog
(74) *Attorney, Agent, or Firm* — Baratta Law PLLC; Lawrence A. Baratta, Jr.; Ryan Odessa

(57) ABSTRACT

Systems and methods for Data Loss Protection (DLP) utilizing distilled models include receiving a plurality of general data predictions from a teacher model; determining one or more strengths of the teacher model based on the received general data predictions; generating a synthetic dataset based on the one or more strengths of the teacher model; providing the synthetic dataset to the teacher model and receiving a plurality of synthetic data predictions from the teacher model based thereon; and performing knowledge distillation on a student model based on the synthetic data predictions received from the teacher model to produce a distilled model. The distilled model is then used in production for classifying inputs to a DLP system.

20 Claims, 23 Drawing Sheets

(56) References Cited

U.S. PATENT DOCUMENTS 8,572,527 B1 10/2013 Coelho, Jr. et al.
8,990,745 B1 3/2015 Coelho et al.
9,152,789 B2 10/2015 Natarajan et al.
9,609,015 B2 3/2017 Natarajan et al.
9,659,142 B1 5/2017 Coelho, Jr. et al.
9,817,930 B1 11/2017 Campos et al.
9,934,410 B1 4/2018 Purri et al.
10,911,233 B2 2/2021 Bayar et al.
11,025,907 B2 6/2021 Li et al.
11,310,501 B2 4/2022 Coelho et al.
11,429,589 B2 8/2022 Paul et al.
11,455,407 B2 9/2022 Zhang et al.
11,475,368 B2 10/2022 Shang et al.
11,669,779 B2 6/2023 Lin et al.
11,785,022 B2 10/2023 Ma et al.
11,805,138 B2 10/2023 Paul et al.
11,829,347 B2 11/2023 Paul et al.
2007/0022323 A1 1/2007 Loh et al.
2016/0283628 A1 9/2016 Peixoto et al.
2019/0251476 A1 8/2019 Shiebler et al.
2021/0049413 A1 2/2021 Ma et al.
2021/0051322 A1 2/2021 Coelho et al.
2021/0119798 A1 4/2021 Bayar et al.
2021/0326460 A1 10/2021 Zhang et al.
2021/0326461 A1 10/2021 Paul et al.
2021/0329010 A1 10/2021 Paul et al.
2021/0374121 A1 12/2021 Paul et al.
2021/0377303 A1 12/2021 Bui et al.
2021/0377304 A1 12/2021 Ma et al.
2021/0392146 A1 12/2021 Lin et al.
2021/0397988 A1* 12/2021 Sarpatwar ............... H04L 9/008
2022/0027469 A1 1/2022 Vivekanandan et al.
2022/0067581 A1 3/2022 Kumar et al.
2022/0083659 A1 3/2022 Ma et al.
2022/0083661 A1 3/2022 Ma et al.
2022/0138633 A1* 5/2022 Choi ........................ G06N 3/08
706/12
2022/0201316 A1 6/2022 Coelho et al.
2022/0253430 A1 8/2022 Paul et al.
2022/0301293 A1* 9/2022 Inoshita ............... G06V 10/764
2022/0383206 A1* 12/2022 Luong .................. G06N 3/0895
2022/0385635 A1 12/2022 Thimmisetty et al.
2023/0018188 A1 1/2023 Shang et al.
2023/0037489 A1 2/2023 Paul et al.
2023/0042051 A1* 2/2023 Clement ................ G06N 3/091
2023/0080654 A1 3/2023 Si et al.
2023/0115982 A1 4/2023 Lin et al.
2023/0123157 A1 4/2023 Ramanan et al.
2023/0229895 A1 7/2023 Coelho, Jr. et al.
2023/0254318 A1 8/2023 Hu et al.
2023/0300114 A1 9/2023 Bhallamudi et al.
2023/0353587 A1 11/2023 Bui et al.
2023/0370495 A1 11/2023 Desai et al.
2023/0376592 A1 11/2023 Ma et al.
2024/0028721 A1 1/2024 Ma et al.
2024/0064178 A1 2/2024 Shete et al.
2024/0119121 A1 4/2024 Lin et al.
2024/0372830 A1* 11/2024 Vörös .................. H04L 63/0236

FOREIGN PATENT DOCUMENTS

EP 3866436 A1 8/2021
EP 3901800 A1 10/2021
EP 3926502 A1 12/2021
EP 3965362 A1 3/2022
EP 4167116 A1 4/2023
WO 2021107965 A1 6/2021
WO 2022098367 A1 5/2022
WO 2022235251 A1 11/2022
WO 2022240391 A1 11/2022

* cited by examiner

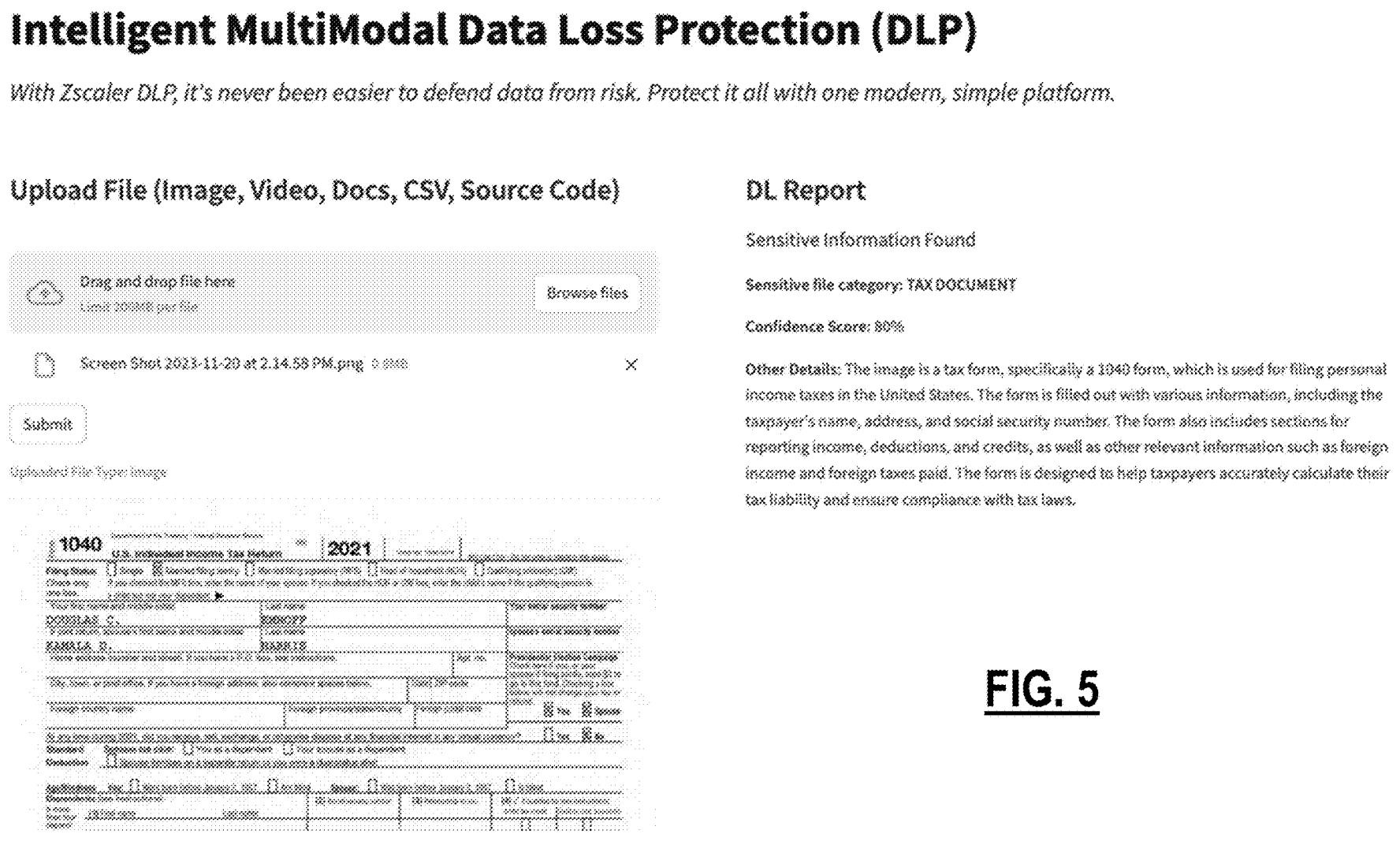

Intelligent MultiModal Data Loss Protection (DLP)

*With Zscaler DLP, it's never been easier to defend data from risk. Protect it all with one modern, simple platform.*

Upload File (Image, Video, Docs, CSV, Source Code)

Drag and drop file here

Browse files

Screen Shot 2023-11-20 at 2.14.58 PM.png

Submit

Uploaded File Type: image 1040 2021

DL Report

Sensitive Information Found

Sensitive file category: TAX DOCUMENT

Confidence Score: 80%

Other Details: The image is a tax form, specifically a 1040 form, which is used for filing personal income taxes in the United States. The form is filled out with various information, including the taxpayer's name, address, and social security number. The form also includes sections for reporting income, deductions, and credits, as well as other relevant information such as foreign income and foreign taxes paid. The form is designed to help taxpayers accurately calculate their tax liability and ensure compliance with tax laws.

FIG. 5

| | precision | recall | f1-score |
|---|---|---|---|
| CORPORATE_FINANCE | 0.98 | 0.93 | 0.96 |
| CORPORATE_LEGAL | 0.82 | 0.91 | 0.86 |
| Court_forums | 0.90 | 0.82 | 0.86 |
| DMV | 0.84 | 0.96 | 0.90 |
| IMMIGRATION_DOCUMENTS | 0.88 | 0.77 | 0.82 |
| INSURANCE_DOCUMENTS | 0.94 | 0.94 | 0.94 |
| INVOICES | 0.84 | 0.69 | 0.76 |
| LEGAL_DOCUMENTS | 0.92 | 0.90 | 0.91 |
| MEDICAL_DOCUMENTS | 1.00 | 0.20 | 0.33 |
| REAL_ESTATE_DOCUMENTS | 0.87 | 0.79 | 0.83 |
| Resume | 0.99 | 0.98 | 0.99 |
| TAX_DOCUMENTS | 1.00 | 0.40 | 0.57 |
| TECHNICAL_DOCUMENTS | 0.93 | 0.96 | 0.94 |
| accuracy | | | 0.90 |
| macro avg | 0.92 | 0.79 | 0.82 |
| weighted avg | 0.90 | 0.90 | 0.90 |

| | precision | recall | f1-score |
|---|---|---|---|
| financial document | 0.86 | 0.94 | 0.90 |
| insurance document | 0.96 | 0.83 | 0.89 |
| legal document | 0.89 | 0.89 | 0.89 |
| medical document | 0.87 | 1.00 | 0.93 |
| motor vehicle document | 0.92 | 0.89 | 0.90 |
| real estate document | 0.75 | 0.69 | 0.72 |
| resume | 1.00 | 1.00 | 1.00 |
| tax document | 0.88 | 0.92 | 0.90 |
| technical document | 0.98 | 0.94 | 0.96 |
| accuracy | | | 0.90 |
| macro avg | 0.90 | 0.90 | 0.90 |
| weighted avg | 0.91 | 0.90 | 0.90 |

FIG. 10

| | precision | recall | f1-score |
|---|---|---|---|
| automobile insurance | 0.82 | 0.90 | 0.86 |
| corporate finance statement | 0.62 | 0.56 | 0.59 |
| health insurance | 1.00 | 0.60 | 0.75 |
| home insurance | 0.88 | 0.78 | 0.82 |
| invoice | 0.77 | 0.83 | 0.80 |
| legal bylaws | 1.00 | 0.67 | 0.80 |
| legal contracts | 0.83 | 0.71 | 0.77 |
| legal court filings | 0.91 | 1.00 | 0.95 |
| legal limited liability company | 0.77 | 0.91 | 0.83 |
| legal partnerships agreement | 0.75 | 0.90 | 0.82 |
| medical diagnosis | 1.00 | 0.10 | 0.18 |
| medical prescription | 1.00 | 0.50 | 0.67 |
| medical records | 0.28 | 1.00 | 0.44 |
| motor vehicle license | 0.90 | 1.00 | 0.95 |
| motor vehicle registration | 0.69 | 0.92 | 0.79 |
| motor vehicle transfer | 0.90 | 0.56 | 0.69 |
| personal finance statement | 0.54 | 0.88 | 0.67 |
| real estate escrow | 0.00 | 0.00 | 0.00 |
| real estate lease agreement | 0.43 | 0.90 | 0.58 |
| real estate mortgages | 1.00 | 0.33 | 0.50 |
| receipt | 0.82 | 0.75 | 0.78 |
| resume | 1.00 | 1.00 | 1.00 |
| securities and exchange commission filings | 0.73 | 0.80 | 0.76 |
| tax document federal | 0.67 | 0.71 | 0.69 |
| tax document state | 0.70 | 0.70 | 0.70 |
| technical document design document | 0.54 | 0.87 | 0.67 |
| technical document manuals | 1.00 | 0.27 | 0.43 |
| technical document patent | 1.00 | 0.85 | 0.92 |
| technical document release notes | 1.00 | 0.80 | 0.89 |
| technical document source code | 0.91 | 1.00 | 0.95 |
| technical document technical specifications | 0.83 | 0.71 | 0.77 |
| technical white papers | 0.83 | 0.91 | 0.87 |
| accuracy | | | 0.74 |
| macro avg | 0.78 | 0.73 | 0.71 |
| weighted avg | 0.80 | 0.74 | 0.73 |

FIG. 11

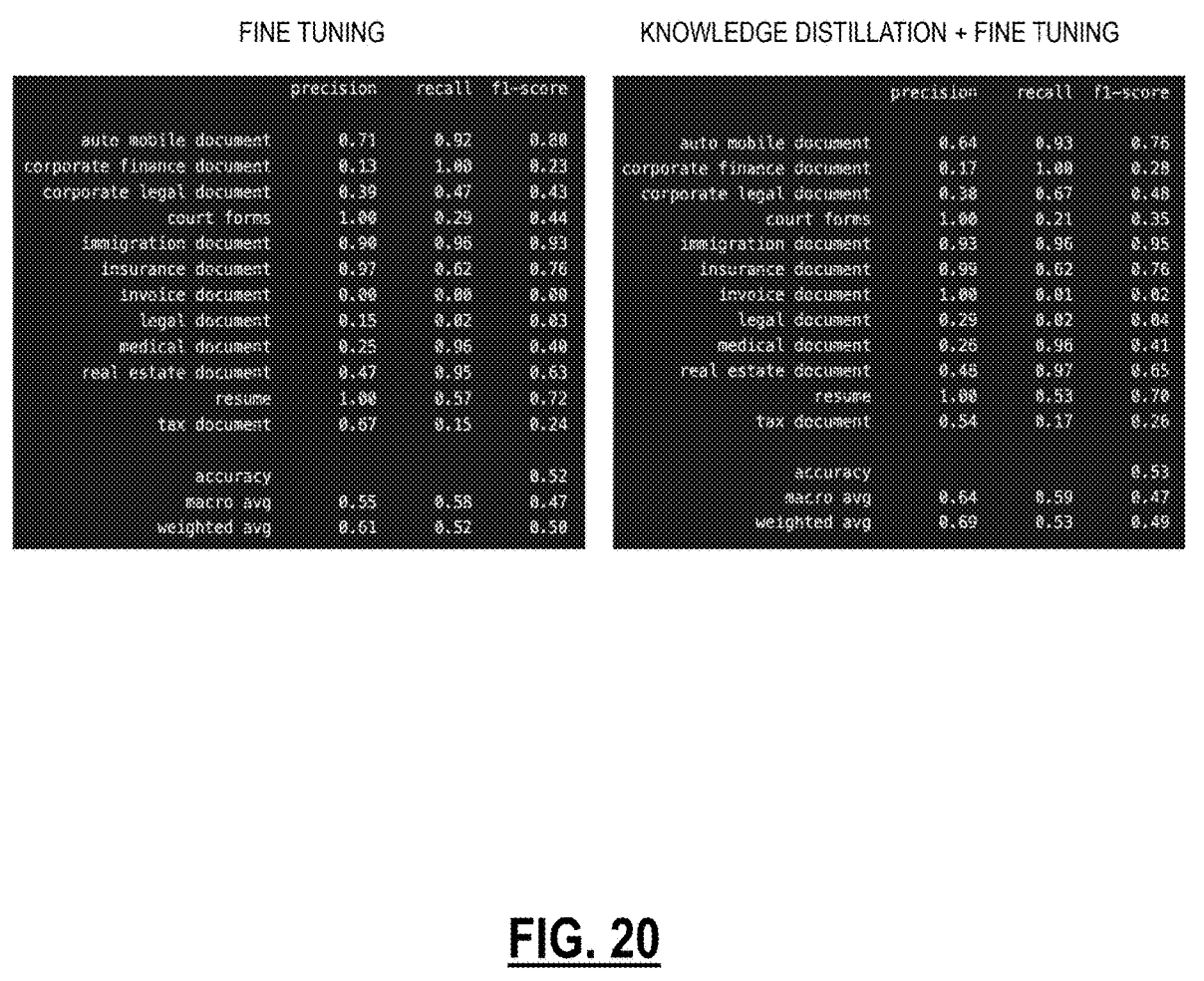

FINE TUNING

| | precision | recall | f1-score |
|---|---|---|---|
| auto mobile document | 0.71 | 0.92 | 0.80 |
| corporate finance document | 0.13 | 1.00 | 0.23 |
| corporate legal document | 0.39 | 0.47 | 0.43 |
| court forms | 1.00 | 0.29 | 0.44 |
| immigration document | 0.90 | 0.96 | 0.93 |
| insurance document | 0.97 | 0.62 | 0.76 |
| invoice document | 0.00 | 0.00 | 0.00 |
| legal document | 0.15 | 0.02 | 0.03 |
| medical document | 0.25 | 0.96 | 0.40 |
| real estate document | 0.47 | 0.95 | 0.63 |
| resume | 1.00 | 0.57 | 0.72 |
| tax document | 0.67 | 0.15 | 0.24 |
| accuracy | | | 0.52 |
| macro avg | 0.55 | 0.58 | 0.47 |
| weighted avg | 0.61 | 0.52 | 0.50 |

KNOWLEDGE DISTILLATION + FINE TUNING

| | precision | recall | f1-score |
|---|---|---|---|
| auto mobile document | 0.64 | 0.93 | 0.76 |
| corporate finance document | 0.17 | 1.00 | 0.28 |
| corporate legal document | 0.38 | 0.67 | 0.48 |
| court forms | 1.00 | 0.21 | 0.35 |
| immigration document | 0.93 | 0.96 | 0.95 |
| insurance document | 0.99 | 0.62 | 0.76 |
| invoice document | 1.00 | 0.01 | 0.02 |
| legal document | 0.29 | 0.02 | 0.04 |
| medical document | 0.26 | 0.96 | 0.41 |
| real estate document | 0.48 | 0.97 | 0.65 |
| resume | 1.00 | 0.53 | 0.70 |
| tax document | 0.54 | 0.17 | 0.26 |
| accuracy | | | 0.53 |
| macro avg | 0.64 | 0.59 | 0.47 |
| weighted avg | 0.69 | 0.53 | 0.49 |

FIG. 20

STUDENT MODEL

| | precision | recall | f1-score |
|---|---|---|---|
| auto mobile document | 0.80 | 0.25 | 0.38 |
| corporate finance document | 0.10 | 0.96 | 0.18 |
| corporate legal document | 0.13 | 0.03 | 0.05 |
| court forms | 0.70 | 0.10 | 0.18 |
| immigration document | 0.76 | 0.86 | 0.81 |
| insurance document | 0.89 | 0.85 | 0.87 |
| invoice document | 0.56 | 0.12 | 0.20 |
| legal document | 0.29 | 0.72 | 0.42 |
| medical document | 0.37 | 0.78 | 0.50 |
| real estate document | 0.36 | 0.29 | 0.32 |
| resume | 1.00 | 0.03 | 0.05 |
| tax document | 0.00 | 0.00 | 0.00 |
| accuracy | | | 0.35 |
| macro avg | 0.50 | 0.42 | 0.33 |
| weighted avg | 0.61 | 0.35 | 0.31 |

TEACHER MODEL

| | precision | recall | f1-score |
|---|---|---|---|
| auto mobile document | 0.90 | 0.81 | 0.85 |
| corporate finance document | 0.89 | 0.91 | 0.90 |
| corporate legal document | 0.39 | 0.95 | 0.55 |
| court forms | 0.90 | 0.75 | 0.82 |
| immigration document | 0.36 | 0.99 | 0.53 |
| insurance document | 0.96 | 0.97 | 0.97 |
| invoice document | 0.98 | 0.28 | 0.44 |
| legal document | 0.31 | 0.15 | 0.20 |
| medical document | 0.28 | 0.98 | 0.44 |
| real estate document | 0.55 | 0.87 | 0.67 |
| resume | 1.00 | 0.73 | 0.84 |
| tax document | 0.39 | 0.17 | 0.24 |
| accuracy | | | 0.67 |
| macro avg | 0.66 | 0.71 | 0.62 |
| weighted avg | 0.74 | 0.67 | 0.66 |

FIG. 21

STUDENT MODEL

802

| | precision | recall | f1-score |
|---|---|---|---|
| auto mobile document | 0.80 | 0.25 | 0.38 |
| corporate finance document | 0.10 | 0.98 | 0.18 |
| corporate legal document | 0.13 | 0.03 | 0.05 |
| court forms | 0.70 | 0.10 | 0.18 |
| immigration document | 0.76 | 0.86 | 0.81 |
| insurance document | 0.89 | 0.85 | 0.87 |
| invoice document | 0.56 | 0.12 | 0.20 |
| legal document | 0.29 | 0.72 | 0.42 |
| medical document | 0.37 | 0.78 | 0.50 |
| real estate document | 0.36 | 0.29 | 0.32 |
| resume | 1.00 | 0.03 | 0.05 |
| tax document | 0.00 | 0.00 | 0.00 |
| accuracy | | | 0.35 |
| macro avg | 0.50 | 0.42 | 0.33 |
| weighted avg | 0.61 | 0.35 | 0.31 |

STUDENT MODEL DISTILLED ON GENERAL DATA

804

| | precision | recall | f1-score |
|---|---|---|---|
| auto mobile document | 0.72 | 0.13 | 0.22 |
| corporate finance document | 0.45 | 0.33 | 0.38 |
| corporate legal document | 0.11 | 0.01 | 0.02 |
| court forms | 0.55 | 0.18 | 0.27 |
| immigration document | 0.67 | 0.96 | 0.79 |
| insurance document | 0.87 | 0.95 | 0.91 |
| invoice document | 0.53 | 0.26 | 0.35 |
| legal document | 0.23 | 0.80 | 0.36 |
| medical document | 0.23 | 0.92 | 0.36 |
| real estate document | 0.35 | 0.58 | 0.44 |
| resume | 1.00 | 0.08 | 0.15 |
| tax document | 0.33 | 0.03 | 0.05 |
| accuracy | | | 0.37 |
| macro avg | 0.50 | 0.44 | 0.36 |
| weighted avg | 0.59 | 0.37 | 0.32 |

STUDENT MODEL DISTILLED FOR SPECIFIC CATEGORIES

806

| | precision | recall | f1-score |
|---|---|---|---|
| auto mobile document | 0.78 | 0.23 | 0.35 |
| corporate finance document | 0.25 | 0.03 | 0.05 |
| corporate legal document | 0.43 | 0.03 | 0.06 |
| court forms | 0.86 | 0.13 | 0.23 |
| immigration document | 0.90 | 0.96 | 0.93 |
| insurance document | 0.88 | 0.96 | 0.91 |
| invoice document | 0.33 | 0.24 | 0.28 |
| legal document | 0.24 | 0.91 | 0.38 |
| medical document | 0.35 | 0.77 | 0.48 |
| real estate document | 0.29 | 0.45 | 0.36 |
| resume | 1.00 | 0.10 | 0.18 |
| tax document | 0.00 | 0.00 | 0.00 |
| accuracy | | | 0.39 |
| macro avg | 0.53 | 0.40 | 0.35 |
| weighted avg | 0.62 | 0.39 | 0.34 |

STUDENT MODEL DISTILLED FOR SPECIFIC CATEGORIES AND GENERAL DATA

808

| | precision | recall | f1-score |
|---|---|---|---|
| auto mobile document | 0.77 | 0.22 | 0.34 |
| corporate finance document | 0.25 | 0.03 | 0.05 |
| corporate legal document | 0.57 | 0.09 | 0.15 |
| court forms | 0.86 | 0.13 | 0.23 |
| immigration document | 0.87 | 0.96 | 0.91 |
| insurance document | 0.87 | 0.97 | 0.91 |
| invoice document | 0.37 | 0.24 | 0.29 |
| legal document | 0.24 | 0.90 | 0.38 |
| medical document | 0.31 | 0.73 | 0.43 |
| real estate document | 0.31 | 0.45 | 0.37 |
| resume | 1.00 | 0.12 | 0.21 |
| tax document | 0.00 | 0.00 | 0.00 |
| accuracy | | | 0.39 |
| macro avg | 0.53 | 0.40 | 0.36 |
| weighted avg | 0.63 | 0.39 | 0.35 |

FIG. 22

DATA LOSS PROTECTION (DLP) UTILIZING DISTILLED LARGE LANGUAGE MODELS (LLMs)

CROSS-REFERENCE TO RELATED APPLICATION(S)

The present disclosure is a continuation-in-part of U.S. patent application Ser. No. 18/735,880, filed Jun. 6, 2024, entitled "Inline multimodal Data Loss Protection (DLP) utilizing fine-tuned image and text models" which is a continuation-in-part of U.S. patent application Ser. No. 18/584,354, filed Feb. 22, 2024, entitled "Multimodal Data Loss Protection using artificial intelligence" the contents of which are incorporated by reference in their entirety.

FIELD OF THE DISCLOSURE

The present disclosure generally relates to computer networking systems and methods, particularly focused on securing sensitive data. More particularly, the present disclosure relates to systems and methods for Data Loss Protection (DLP) utilizing distilled models.

BACKGROUND OF THE DISCLOSURE

In computing, networking, Information Technology (IT), cybersecurity, and the like, Data Loss Protection (DLP), also referred to as Data Loss Prevention, simply Data Protection (when referring to the protection aspect) or simply Data Loss (when referring to the detection aspect or the problem itself), relates to various aspects protecting sensitive corporate data. Of course, a corporation or any organization's data is one of its most important assets and any loss or theft has significant economic exposure. Corporate data can be leaked in different ways, i.e., through email, web mail, cloud storage, social media, and a variety of other applications, as well as simply attaching storage devices and copying files. Companies can set up a policy using predefined templates (e.g. regular expression matching) for sensitive data formats to avoid data breaches. For example, some existing approaches for DLP are described in commonly-assigned U.S. Pat. No. 11,829,347, issued Nov. 28, 2023, and entitled "Cloud-based data loss prevention," the contents of which are incorporated by reference in their entirety. These approaches generally require the company to provide a dictionary and the detection techniques include Exact Data Matching (EDM), where specific keywords, classes of data, etc. are flagged, or Indexed Data Matching (IDM), where content that matches the whole or some part of a document from a repository of documents is flagged, along with possible Optical Character Recognition (OCR) to get any text from images. While these approaches are effective in securing data, they require up front input (i.e., the dictionaries) and can be overly restrictive or may miss certain crucial files because of challenges in comprehending the combination of various file formats (e.g., images, text, video, etc.). There is a need in DLP to detect potential data loss without specifying the data up front, without sharing sensitive data, and with an ability to detect across different modes.

BRIEF SUMMARY OF THE DISCLOSURE

The present disclosure relates to systems and methods for Data Loss Protection (DLP) utilizing distilled models. In particular, the approach is multimodal in that it can understand or generate information across multiple modes or types of data (e.g., text, image, video, audio, etc.). The present disclosure utilizes artificial intelligence and machine learning, where a trained multimodal system can process and integrate information from various modalities, i.e., text, images, sound, video and more. Advantageously, the trained multimodal system can detect categories of data being accessed, transferred, etc., without the requirement of up-front dictionaries from corporate IT. Even further, utilizing advanced model optimizations described herein allows the systems to utilize smaller, more efficient models for content/data classification as well as sensitive data identification.

In various embodiments, the present disclosure includes a computer-implemented method for multimodal Data Loss Protection (DLP) having steps, a cloud service configured to implement the steps, a server or any other processing device configured to implement the steps, and a non-transitory computer-readable medium storing instructions that, when executed, cause one or more processors to execute the steps. The steps include receiving a plurality of general data predictions from a teacher model; determining one or more strengths of the teacher model based on the received general data predictions; generating a synthetic dataset based on the one or more strengths of the teacher model; providing the synthetic dataset to the teacher model and receiving a plurality of synthetic data predictions from the teacher model based thereon; and performing knowledge distillation on a student model based on the synthetic data predictions received from the teacher model to produce a distilled model.

The steps can further include wherein the teacher model and the student model are Large Language Models (LLMs). Prior to receiving the plurality of general data predictions from the teacher model, the steps can include providing, to the teacher model, a general Data Loss Protection (DLP) dataset. The plurality of general data predictions and plurality of synthetic data predictions can include content category classification predictions. Determining the one or more strengths of the teacher model can include determining one or more categories in which the teacher model performs classification with an accuracy above a threshold. Generating the synthetic dataset can include utilizing a Large Language Model (LLM) to generate a plurality of inputs associated with the one or more strengths of the teacher model, wherein the synthetic dataset includes the plurality of inputs. The steps can further include utilizing the distilled model in production for classifying inputs to a Data Loss Protection (DLP) system. The steps can further include receiving an input comprising data in any of a plurality of formats; processing the input via the distilled model to classify the input into a category of a plurality of categories; and providing an indication of the category of the plurality of categories. The steps can further include processing the input to determine whether or not the data includes sensitive data prior to processing the input for classification. The plurality of formats can include text formats, image formats, audio formats, video formats, source code, and a combination thereof.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a screenshot of an example output of the a multimodal DLP system of FIG. 4.

FIG. 10 is a table of example of categorization results using the process of FIG. 9.

FIG. 11 is a table of examples of sub-category results.

FIG. 20 is a comparison of category classification metrics between two models.

FIG. 21 is a diagram showing the performance of a standard student model and a standard teacher model.

FIG. 22 is a diagram comparing the performance of a student model optimized via various methods.

DETAILED DESCRIPTION OF THE DISCLOSURE

Again, the present disclosure relates to systems and methods for Data Loss Protection (DLP) utilizing distilled models. Various embodiments include mechanisms for generating a distilled model based on a relatively small student model in a knowledge distillation procedure. Traditionally, large models excel at performing tasks such as content classification and the like. Although useful, these large models cannot be used in production as they require large amounts of computing resources and introduce latency, thereby negatively impacting the user experience. The present systems and methods provide mechanisms for training smaller models to perform effectively in production environments while maintaining prediction accuracy and minimizing computational resource usage.

§ 1.0 Cybersecurity Monitoring and Protection Examples

Figure 1A:
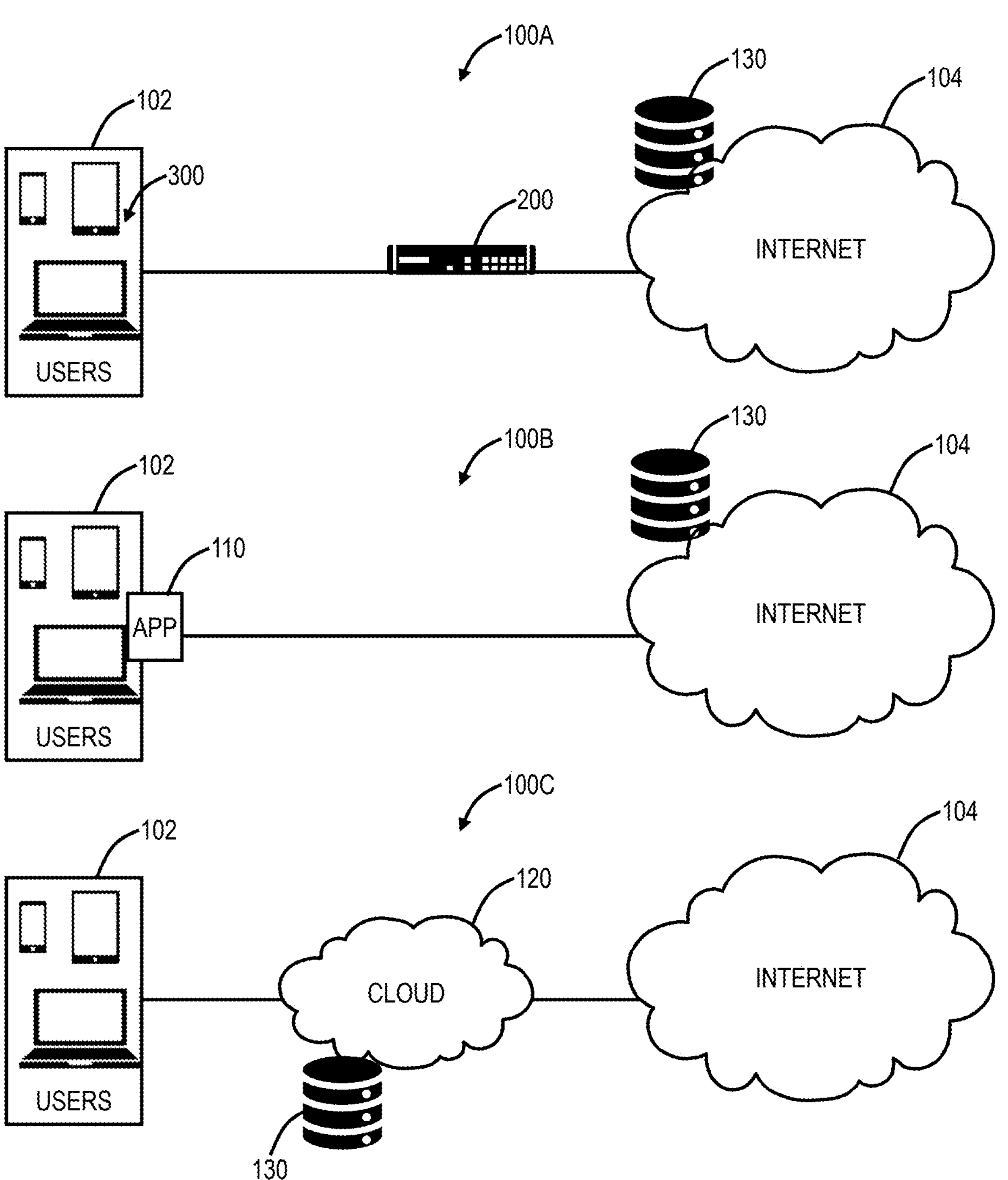
FIG. 1A is a network diagram of three example network configurations of cybersecurity monitoring of a user.
Figure 2:
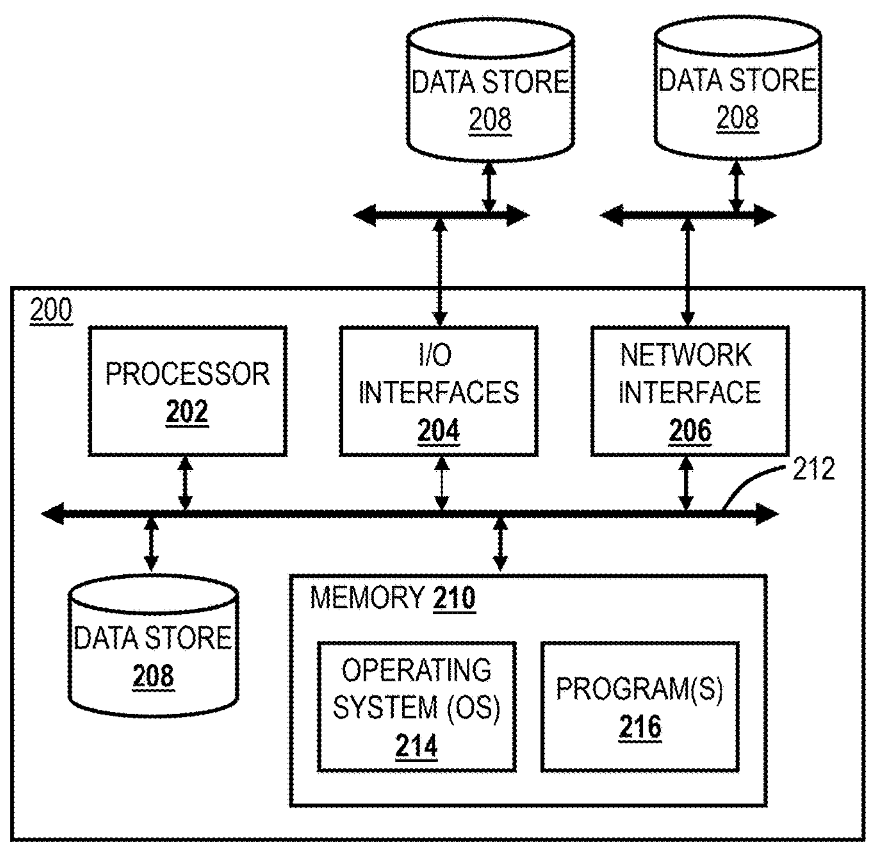
FIG. 2 is a block diagram of a server.
Figure 3:
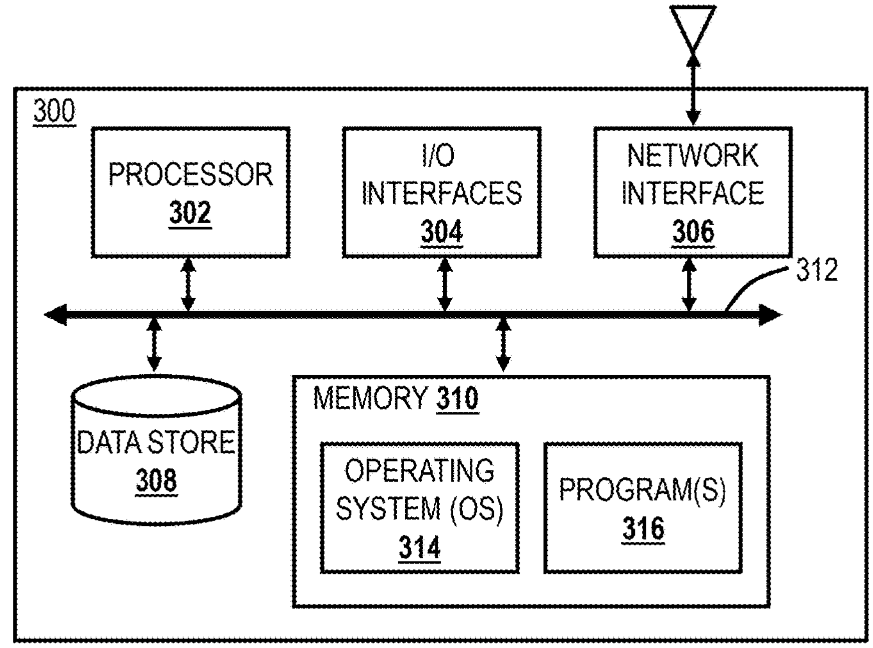
FIG. 3 is a block diagram of a user device.

FIG. 1A is a network diagram of three example network configurations 100A, 100B, 100C of cybersecurity monitoring and protection of a user 102. Those skilled in the art will recognize these are some examples for illustration purposes, there may be other approaches to cybersecurity monitoring, and these various approaches can be used in combination with one another as well as individually. Also, while shown for a single user 102, practical embodiments will handle a large volume of users 102, including multi-tenancy. In this example, the user 102 (having a user device 300 such as illustrated in FIG. 3) communicates on the Internet 104, including accessing cloud services, Software-as-a-Service, etc. (each may be offered via compute resources, such as using one or more servers 200 as illustrated in FIG. 2). As part of offering cybersecurity through these example network configurations 100A, 100B, 100C, there is a large amount of cybersecurity data obtained. The present disclosure focuses on using this cybersecurity data for various purposes.

The network configuration 100A includes a server 200 located between the user 102 and the Internet 104. For example, the server 200 can be a proxy, a gateway, a Secure Web Gateway (SWG), Secure Internet and Web Gateway, Secure Access Service Edge (SASE), Secure Service Edge (SSE), Cloud Application Security Broker (CASB), etc. The server 200 is illustrated located inline with the user 102 and configured to monitor the user 102. In other embodiments, the server 200 does not have to be inline. For example, the server 200 can monitor requests from the user 102 and responses to the user 102 for one or more security purposes, as well as allow, block, warn, and log such requests and responses. The server 200 can be on a local network associated with the user 102 as well as external, such as on the Internet 104. The network configuration 100B includes an application 110 that is executed on the user device 300. The application 110 can perform similar functionality as the server 200, as well as coordinated functionality with the server 200. Finally, the network configuration 100C includes a cloud service 120 configured to monitor the user 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the users 102, using signatures sourced and constantly updated. The DNS security can identify and route command-and-control connections to threat detection engines for full content inspection. The DLP can use standard and/or custom dictionaries to continuously monitor the users 102, including compressed and/or Secure Sockets Layer (SSL)-encrypted traffic.

In some embodiments, the network configurations 100A, 100B, 100C can be multi-tenant and can service a large volume of the users 102. Newly discovered threats can be promulgated for all tenants practically instantaneously. The users 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of users 102 under management by an IT group, department, administrator, etc., i.e., some group of users 102 that are managed together. One advantage of multi-tenancy is the visibility of cybersecurity threats across a large number of users 102, across many different organizations, across the globe, etc. This provides a large volume of data to analyze, use artificial intelligence techniques on, develop comparisons, etc.

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own users 102 and configuration, policy, rules, etc.

§ 1.1 Cloud Monitoring

The cloud 120 can scale cybersecurity monitoring and protection with near-zero latency on the users 102. Also, the cloud 120 in the network configuration 100C can be used with or without the application 110 in the network configuration 100B and the server 200 in the network configuration 100A. Logically, the cloud 102 can be viewed as an overlay network between users 102 and the Internet 104 (and cloud services, SaaS, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the users 102, as well as independent of platform, operating system, network access technique, network access provider, etc.

There are various techniques to forward traffic between the users 102 and the cloud 120. A key aspect of the cloud 120 (as well as the other network configurations 100A, 100B) is all traffic between the users 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide the access control, threat prevention, and data protection. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated.

§ 1.2 Zero Trust

Figure 1B:
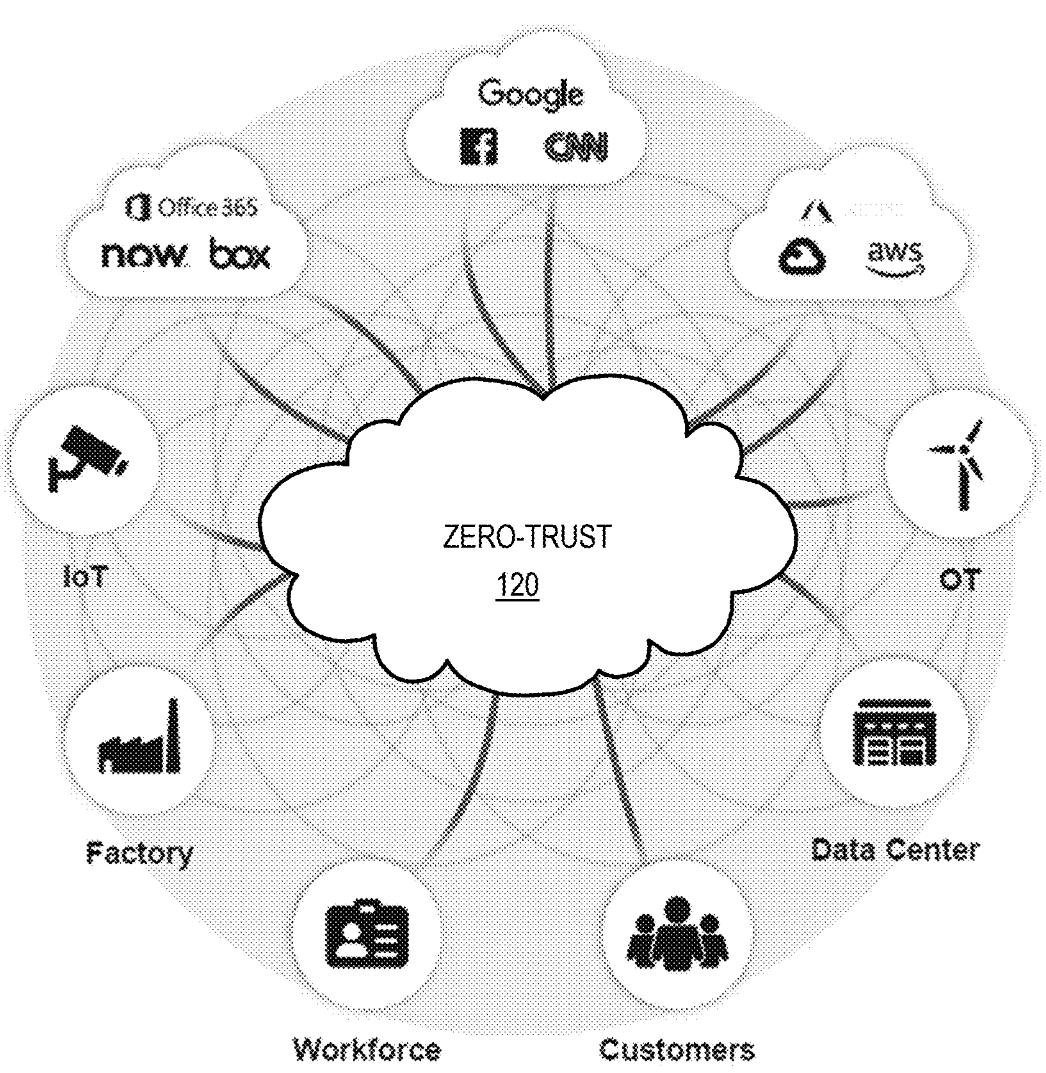
FIG. 1B is a logical diagram of the cloud from FIG. 1A operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120 Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

§ 2.0 Example Server Architecture

FIG. 2 is a block diagram of a server 200, which may be used in as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize the cloud 120 ultimately runs on one or more physical servers 200, virtual machines, etc.

§ 3.0 Example User Device Architecture

FIG. 3 is a block diagram of a user device 300, which may be used by a user 102. Specifically, the user device 300 can form a device used by one of the users 102, and this may include common devices such as laptops, smartphones, tablets, netbooks, personal digital assistants, cell phones, e-book readers, Internet-of-Things (IoT) devices, servers, desktops, printers, televisions, streaming media devices, storage devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. The application 110 can be one of the example programs.

§ 4.0 Data Loss

DLP involves monitoring of an organization's sensitive data, including data at endpoint devices, data at rest (i.e., stored somewhere), and data in motion (i.e., being transmitted somewhere). DLP monitoring approaches focus on a variety of products, including software agents at endpoints, physical appliances, virtual appliances, etc. As applications move to the cloud, users are accessing them directly, everywhere they connect, inevitably leaving blind spots as users bypass security controls in conventional DLP approaches while off-network. As such, previously referenced U.S. Pat. No. 11,829,347, issued Nov. 28, 2023, and entitled "Cloud-based data loss prevention," describes cloud-based techniques.

The present disclosure includes an artificial intelligence based approach to DLP that categorizes data into one of a plurality of categories. Those skilled in the art will recognize this approach can be used in any system architecture, including the network configurations 100A, 100B, 100C of cybersecurity monitoring and protection, variants thereof, as well as other approaches known in the art. Further, the artificial intelligence based approach can be used in combination with existing DLP approaches known in the art.

§ 4.1 Conventional DLP

Generally, all of these existing techniques utilize DLP dictionaries which include specific kinds of information in users' traffic and information as well as custom information. For example, specific kinds of information can look for types of data, e.g., Personally Identifiable Information (PII), bank information, credit card information, etc. That is, the specific information can detect something based on its format with a simple example being a social security number which is formatted as XXX-XX-XXX. The custom information can be specific keywords from a company, e.g., customer names, product names, etc. Also, the custom information can be specific documents, i.e., the sensitive information itself. That is, DLP can detect keywords, specific kinds of information, and actual documents as well as portions of actual documents.

With the dictionaries, there can be different techniques to detect this information, including Exact Data Matching (EDM) where specific keywords, classes of data, etc. are flagged. For example, DLP can detect social security numbers, credit card numbers, etc. based on the data format, such as in structured documents, etc. There can also be an approach in unstructured documents referred to as Indexed Document Matching (IDM) to identify and protect content that matches the whole or some part of a document from a repository of documents. Further, either of these approaches can be performed with Optical Character Recognition (OCR) as well to cover non-text data.

Again, these approaches work well but have a couple of disadvantages. First, these approaches require up-front dictionaries. For the specific kinds of information, DLP monitoring systems typically offer predefined dictionaries for the specific kinds of information. So, IT can preselect these dictionaries. For the repository of documents, IT has to provide this information. To address the desire to avoid sharing sensitive information, approaches provide hashing to allow detection of the sensitive information without sharing the actual sensitive information. However, a key point here is the need to provide information and/or select dictionaries in advance. One further disadvantage is these approaches tend to be overly restrictive (false positives) or miss critical information (false negatives). In the overly restrictive case, users 102 are prohibited from exchanging data that falls into a rule, e.g., blocking and reporting an email which looks like it has banking or PII information, but when this information actually belongs to the user 102. Also, new documents may be missed if they are not in the provided repository.

§ 4.2 Multimodal DLP with Artificial Intelligence

Figure 4:
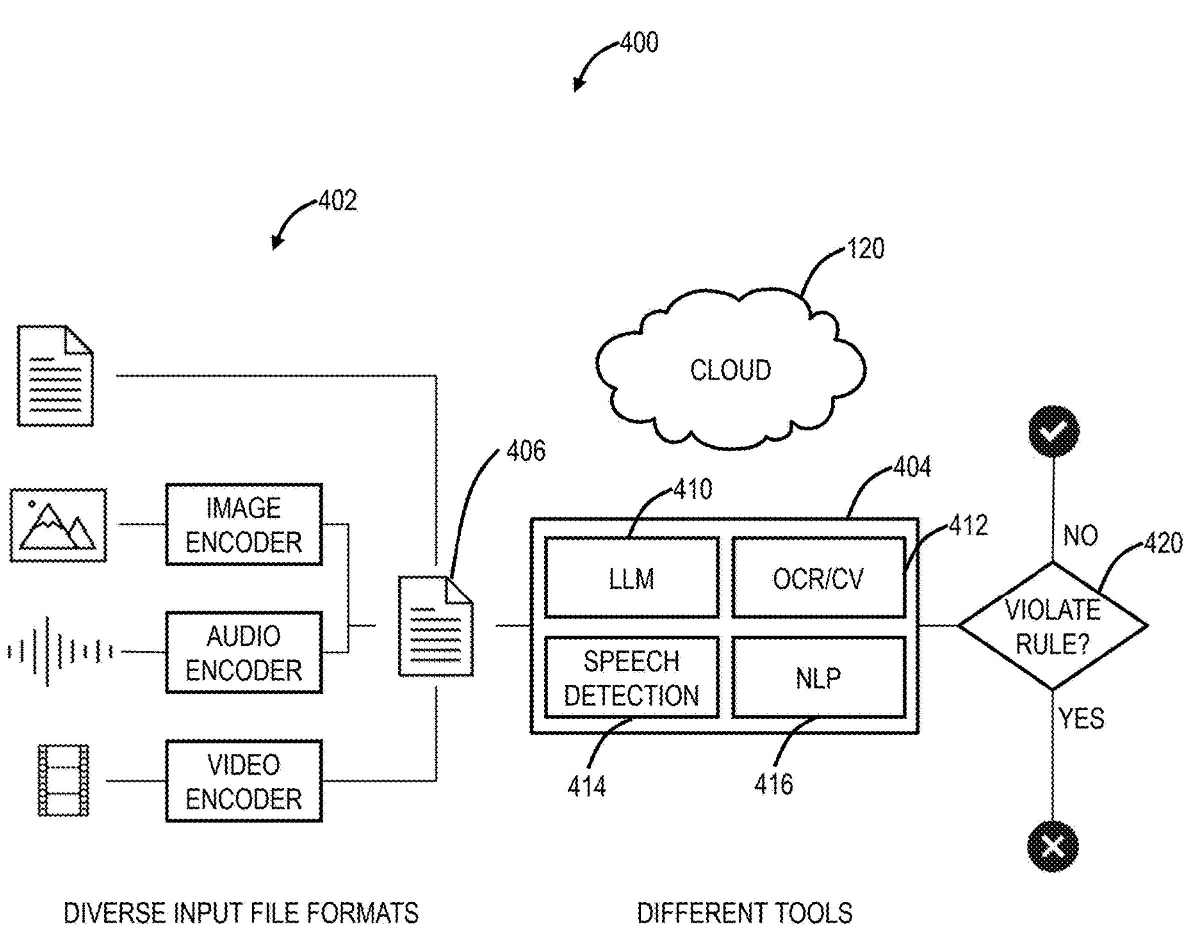
FIG. 4 is a diagram of a multimodal DLP system for analyzing different input file formats with various tool.

FIG. 4 is a diagram of a multimodal DLP system 400 for analyzing different input file formats 402 with various tools 404. The multimodal DLP system 400 is referred to as a system and those skilled in the art will recognize this can be implemented as a method with steps, via a non-transitory computer-readable medium with instructions that cause one or more processors to implement the steps, and via computing resources configured to implement the steps. For example, the computing resources can include the cloud 120, the server 200, the user device 300, etc.

The multimodal DLP system 400 is referred to as multimodal meaning it can understand or generate information across multiple modes or types of data. In the context of artificial intelligence and machine learning, the multimodal DLP system 400 can process and integrate information from various modalities, such as text, images, sound, video and more. Traditional DLP solutions are limited to understanding and managing text and image-based data, and the world has transitioned to a broader set of visual and audio multimedia formats. The multimodal DLP system 400 enhances the way DLP will operate by integrating generative AI and multi-modal capabilities to protect customers' data from leakage across various media formats beyond text and images, such as video and audio formats.

As such, the input file formats 402 contemplate any type of content which can be used to convey information. The input file formats 402 can be images, text, audio, video, and combinations thereof. In particular, the input file formats 402 can extend beyond anything that can be reduced to text. For example, traditional approaches look for text in images or video, such as via OCR, and for text in audio, such as via converting the audio to text. With artificial intelligence and machine learning, the DLP detection is not limited to text, but can extend to pure images and the like. That is, the output of multimodal DLP system 400 is not merely a verdict that some sensitive data is contained in a file, but rather can be to classify the type of content.

In various embodiments, the collective input file formats 402 can include, without limitation, image formats, video formats, text formats, spreadsheets, Comma Separated Values (CSV) formats, source code, presentation formats, Portable Document Format (PDF), and the like. The collective input file formats 402 can be a single input 406 to the tools 404 in the multimodal DLP system 400. The various tools 404 can include one or more Large Language Models (LLMs) 410, an OCR/Computer Vision (CV) system 412, a speech detection system 414, and a Natural Language Processing (NLP) system 416. In some embodiments, the particular tool 404 can be used based on the file format 402. In other embodiments, multiple tools 404 can be used on the same file, e.g., an audio file can be processed by the speech detection system 414 and then processed by the LLMs 410 and/or the NLP system 416. Similarly, in some embodiments, an image or video file can be processed by the OCR/CV system 412 and then processed by the LLMs 410 and/or the NLP system 416. In various embodiments, all different file formats 402 can be processed by the LLMs 410.

The present disclosure contemplates using one or more tools 404 based on the different file formats 402. In an embodiment, the following models were used in the tools 404, individually and in combination with one another:

(1) BLIP (Bootstrapping Language-Image Pre-training), see, e.g., Li, Junnan, et al. "Blip: Bootstrapping language-image pre-training for unified vision-language understanding and generation." International Conference on Machine Learning. PMLR, 2022, the contents of which are incorporated by reference in their entirety. The BLIP model is capable of processing images.

(2) Video LLAMA (Large Language Model Meta AI), see, e.g., Zhang, Hang, Xin Li, and Lidong Bing. "Video-llama: An instruction-tuned audio-visual language model for video understanding." arXiv preprint arXiv:2306.02858 (2023), the contents of which are incorporated by reference in their entirety. The Video LLAMA model is capable of processing images and videos.

(3) LLaVa (Large Language and Vision Assistant), see, e.g., Liu, Haotian, et al. "Visual instruction tuning." arXiv preprint arXiv:2304.08485 (2023). This is a novel end-to-end trained large multimodal that combines a vision encoded and Vicuna for general purpose visual and language understanding (Vicuna is a chat assistant trained by fine0tuning LLAMA on user-shared conversation collected from ShareGTP, see, e.g., Zheng, Lianmin, et al. "Judging LLM-as-a-judge with MT-Bench and Chatbot Arena." arXiv preprint arXiv:2306.05685 (2023), the contents of which are incorporated by reference in their entirety).

(4) BART (Bidirectional and Auto-Regressive Transformers) zero-shot classifier. BART is pre-trained by (1) corrupting text with an arbitrary noising function, and (2) learning a model to reconstruct the original text. Zero-shot classification is a machine learning approach in which a model can classify data into multiple classes without any specific training examples for those classes.

(5) CLIP (Contrastive Language-Image Pretraining), see, e.g., Radford, Alec, et al. "Learning transferable visual models from natural language supervision." International conference on machine learning. PMLR, 2021, the contents of which are incorporated by reference in their entirety. CLIP can predict the most relevant text snippet in a given image.

FIG. 5 is a screenshot of an example output of the multimodal DLP system 400. FIG. 5 is presented for illustration purposes and those skilled in the art will appreciate the output can be used in the cloud 120, in any of the network configurations 100A, 100B, 100C, and the like, for various purposes, including allowing/blocking content, providing notifications and alerts, crawling cloud services for detection, etc. Here, a single file is input (e.g., image, video, docs, CSV, source code, etc.) and the tools 404 analyze the file, e.g., in this case an image—a screenshot in the form of a Portable Network Graphic (PNG) file. The output includes a classification that the information is (1) sensitive and (2) in a category or super category of a Tax document, along with a confidence score (e.g., 80%), as well as with other details, such as derived from the LLMs 410.

§ 4.3 Multimodal DLP with Artificial Intelligence Process

Figure 6:
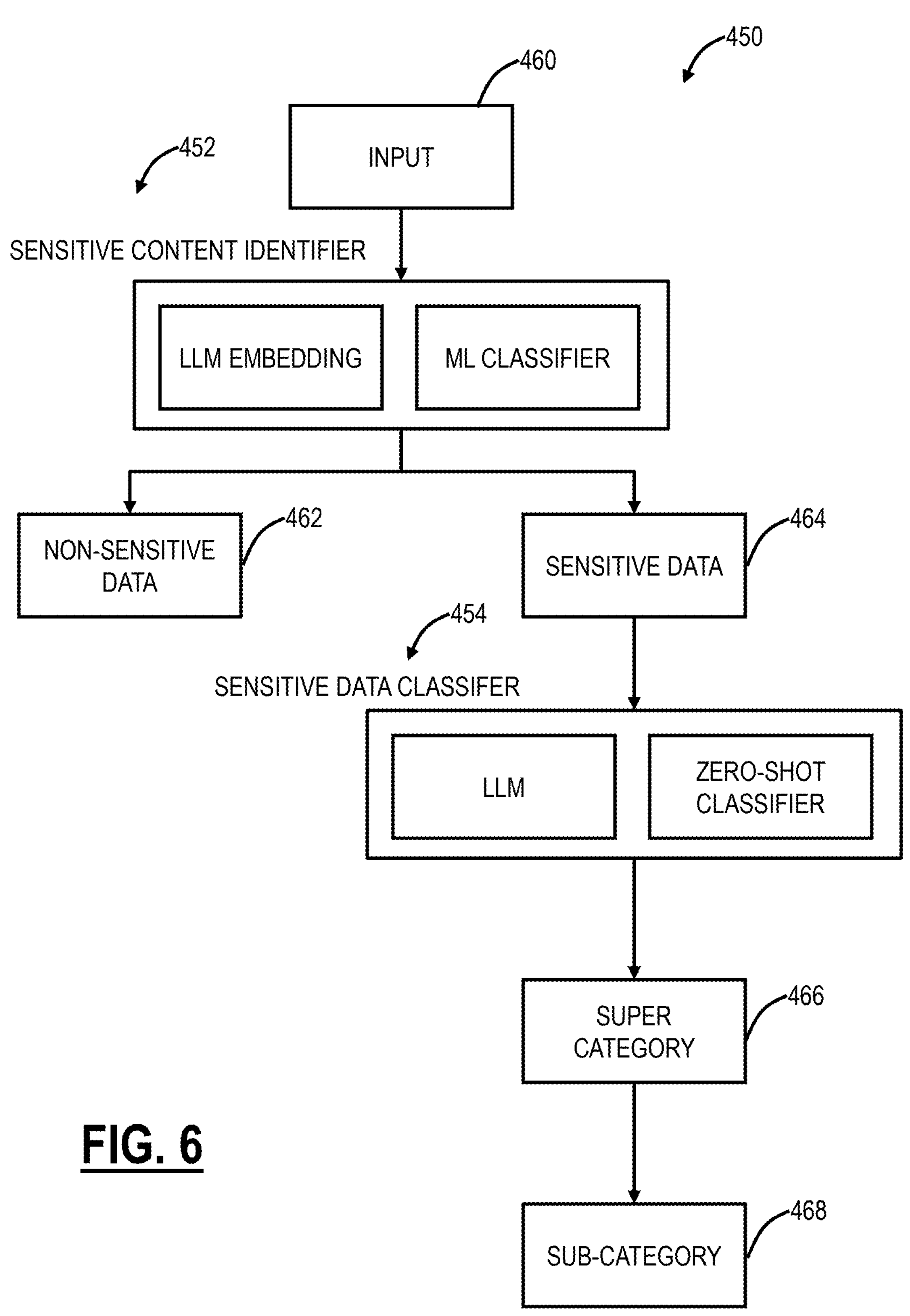
FIG. 6 is a flowchart of a multimodal DLP with artificial intelligence process.

FIG. 6 is a flowchart of a multimodal DLP with artificial intelligence process 450. The process 450 contemplates implementation as a method having steps, via computing resources configured to implement the steps, and as a non-transitory computer-readable medium with instructions that when executed cause one or more processors to implement the steps. The process 450 can be implemented with the multimodal DLP system 400, and practical implementations of the multimodal DLP system 400 and the process 450 can be through the network configurations 100A, 100B, 100C, and the like. That is, the multimodal DLP system 400 and the process 450 contemplate use with any cybersecurity monitoring platform, appliance, service, etc.

The process 450 is implemented via a two-stage classifier including a sensitive content identifier step 452 and a sensitive data classifier step 454. The process 450 uses the two steps to improve the detection of sensitive data and enhance the user experience. The process 450 begins with an input (step 460). Again, the input can be some content in any file format, as well as in a combination of formats. The sensitive content identifier step 452 determines if the input has sensitive data, emphasizing precision and recall for the sensitive category to reduce false positives and false negatives. The sensitive content identifier step 452 can include use of LLM embeddings and a machine learning classifier to determine whether or not the input is sensitive (step 464) or not (step 462). The LLM embeddings are used to detect and classify objects in the inputs and the machine learning classifier can be used to classify text along with the objects. Of course, the process 450 can terminate upon determination the input is not sensitive (step 462), i.e., there is no potential data loss. As such, the sensitive content identifier step 452 enables quicker and more efficient detection.

The sensitive data classifier step 454 only needs to be performed when the input is sensitive. The sensitive data classifier step 454 organizes sensitive information into predefined categories to enhance the user experience and for reporting. For example, the sensitive data classifier step 454 can determine a super category (step 466) as well as a sub-category (step 468). For example, the super category can be financial, engineering, marketing, sales, human resources, tax, etc., i.e., a larger classification. The sub-category can be different for each super category, e.g., for financial-invoice, purchase order, purchase agreement, financial statement, bill of sale, loan agreement, etc., and the like.

The two steps 452, 454 can be used with various cybersecurity monitoring approaches. The sensitive content identifier step 452 can be a front end and in testing has shown accuracy of more than 90%. In the case of data in transit, the sensitive content identifier step 452 can be used to block/allow files. In the case of data at rest, the sensitive content identifier step 452 can be used to efficiently identify and further process sensitive data, i.e., the full detection is not needed on non-sensitive data. The sensitive data classifier step 454 can be used by IT for policy. The two steps 452, 454 can use various combinations of the tools 404, including the example machine learning models described above.

The following table provides some metrics associated with an implementation of the process 450:

| Model | precision | recall |
|---|---|---|
| Sensitive content detector | 0.95 | 0.98 |
| Sensitive data categorizer (super-category) | 0.84 | 0.85 |
| Sensitive data categorizer (sub-category) | 0.78 | 0.73 |

§ 4.4 Image Data De-Noising and Cleaning Algorithm for Image Classification

Both the steps 452, 454 can utilize machine learning models for image classification. In an embodiment, the present disclosure includes various techniques to enhance image data cleanliness and improve quality for tasks related to image classification. These techniques can be used with any image-based file format 402, tool 404 used to process images, and the steps 452, 454. It encompasses three aspects, which can be used together or individually, including OCR, file size filtering, and image hashing.

§ 4.4.1 OCR

OCR includes converting any text in images to a computer-readable text format, i.e., typed, handwritten, or printed text in images or video screenshots into machine-encoded text. For example, PDF documents can be image-based, but represent text documents. Conventionally, OCR is used to convert images to text and then the text is processed through DLP dictionaries. See, e.g., commonly-assigned U.S. Pat. No. 11,805,138, issued Oct. 31, 2023, and entitled "Data Loss Prevention on images," the contents of which are incorporated by reference in their entirety. The present disclosure contemplates OCR with the multimodal DLP system 400 for enhancing processing and/or for improving efficiency, speed, etc.

In an embodiment, OCR can be used in training machine learning models. As is known in the art, supervised learning involves a training process where a machine learning model is trained with labeled samples. After training, the machine learning model is able to perform inferences or classifications in production. In the multimodal DLP system 400, one or more machine learning models can be used in the sensitive content identifier step 452 to classify an image as sensitive or not, and in the sensitive data classifier step 454, to classify an image into one of a plurality of super categories as well as into one or more sub-categories.

For both these tasks, classifying as sensitive/non-sensitive and for categories, there is a requirement for training data which is labeled. For example, a first set of documents each labeled as either sensitive or not, and a second set of documents labeled for categories (of course, this second set of documents can be the same as the first set, different, or include some of the same images). A key aspect of this training is that is does not require individual companies to provide their sensitive information. Rather, the trained machine learning models are trained across a whole set of the documents such as from public repositories, from the model creator, etc.

For example, the model creator can use its own internal documents for training. The model creator can be a SaaS provider, cloud service provider, etc., and has a large amount of internal documents and these are already labeled. The model creator can get documents from finance, HR, sales, engineering, etc. and those labels can be attached for the categories. In other embodiments, labeling for training documents can be performed using other machine learning techniques such as clustering, etc.

In an embodiment, OCR can be used to identify mislabeled samples in either or both of the first set or second sect of training documents. Here, the text can be extracted from labeled sample images and then verified against keywords associated with sensitive data categories. For example, examine whether the extracted text contains words such as 'property,' 'asset,' 'seller,' 'buyer,' or 'purchase agreement' for real estate documents. This can be extended to all of the super categories and the sub-categories in the sensitive data classifier step 454. An output of this OCR can be a suspect set of training documents that can be provided for user input. Output from this can be used to further refine the keywords as well as to relabel any of the suspect set of images.

OCR can also be used in the sensitive content identifier step 452. In an embodiment, classification of sensitive/non-sensitive can be performed in combination with categorization classification. For example, all HR documents are sensitive, etc. In another example, the classification of sensitive/non-sensitive can be performed in with a separate model from the categorization classification. In either case, the OCR can be used to identify mislabeled samples at for the classification of sensitive/non-sensitive. Here, there is a large pool of words for sensitive and non-sensitive.

A key aspect of this technique is it improves the training of the models for classification as the input data is cleaner with respect to labels.

§ 4.4.2 File Size Filtering

In various embodiments, the present disclosure can include a technique of filtering out images that are blurry, unreadable, etc. This filtering technique can be performed in both the first or second set of documents for training as well as in any inputs being analyzed in production by the multimodal DLP system 400. In particular, filtering can be performed based on file size or image resolution. Smaller image files are often blurry and challenging to visualize.

In the training data, the file size filtering can be used to exclude poor images from the first or second set of documents for training. In production, the file size filtering can be used exclude images from processing by the multimodal DLP system 400 where there is no risk due to the image not having any discernible content. In training, this approach improves the quality of the training data, and, in production, this approach improves the efficiency and resource cost of the multimodal DLP system 400.

§ 4.4.3 Image Hashing

Figure 7:
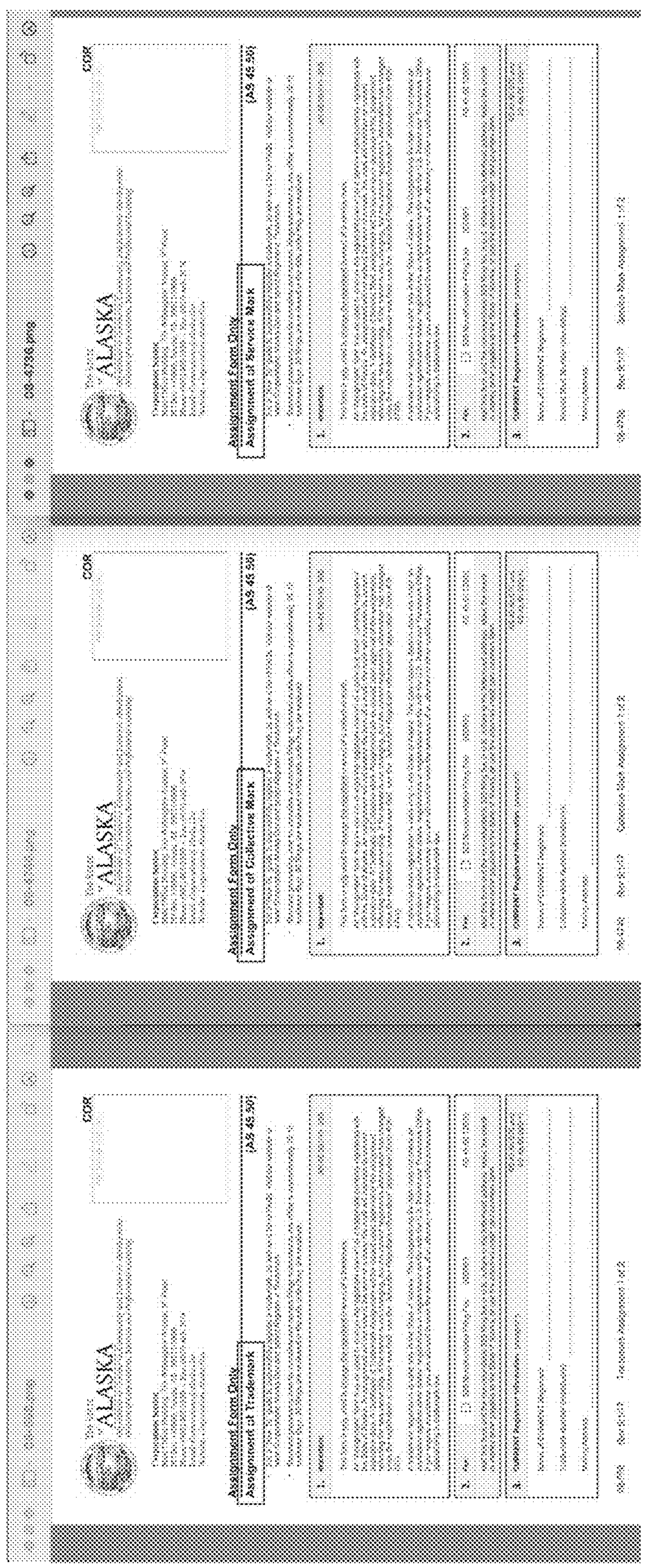
FIG. 7 is a screenshot of three sample images that are closely similar to one another.

Also, the present disclosure can include imaging hashing which can detect identical or closely similar images in the training data, i.e., the first or second set of training data, and eliminate duplicates. FIG. 7 is a screenshot of three sample images that are closely similar to one another. In particular, these three sample images are government documents for Assignment of Trademark, Collective Mark, or Service Mark. That is, the highlighted portion in FIG. 7 shows the only difference between these three documents, i.e., the words Trademark, Collective Mark, or Service Mark before "Assignment of." With image hashing, these three documents are detected as being closely similar to one another, and these three samples are grouped together as they exhibit high similarity with only subtle differences. To prevent data leakage issues, it's advisable to retain only one of them in the training data. In an embodiment, the imaging hashing can utilize ImageHash, available at pypi.org/project/ImageHash/.

§ 4.4.4 Data Cleaning

For the training data, the present disclosure can utilize the various approaches described herein for data cleaning. Some additional approaches for data cleaning on image files include removing observed duplicates as described above, removing logos, removing front pages or guidance (instruction) pages, and the like.

§ 4.5 Combination of LLM and Zero-Shot Classifier

Figure 8:
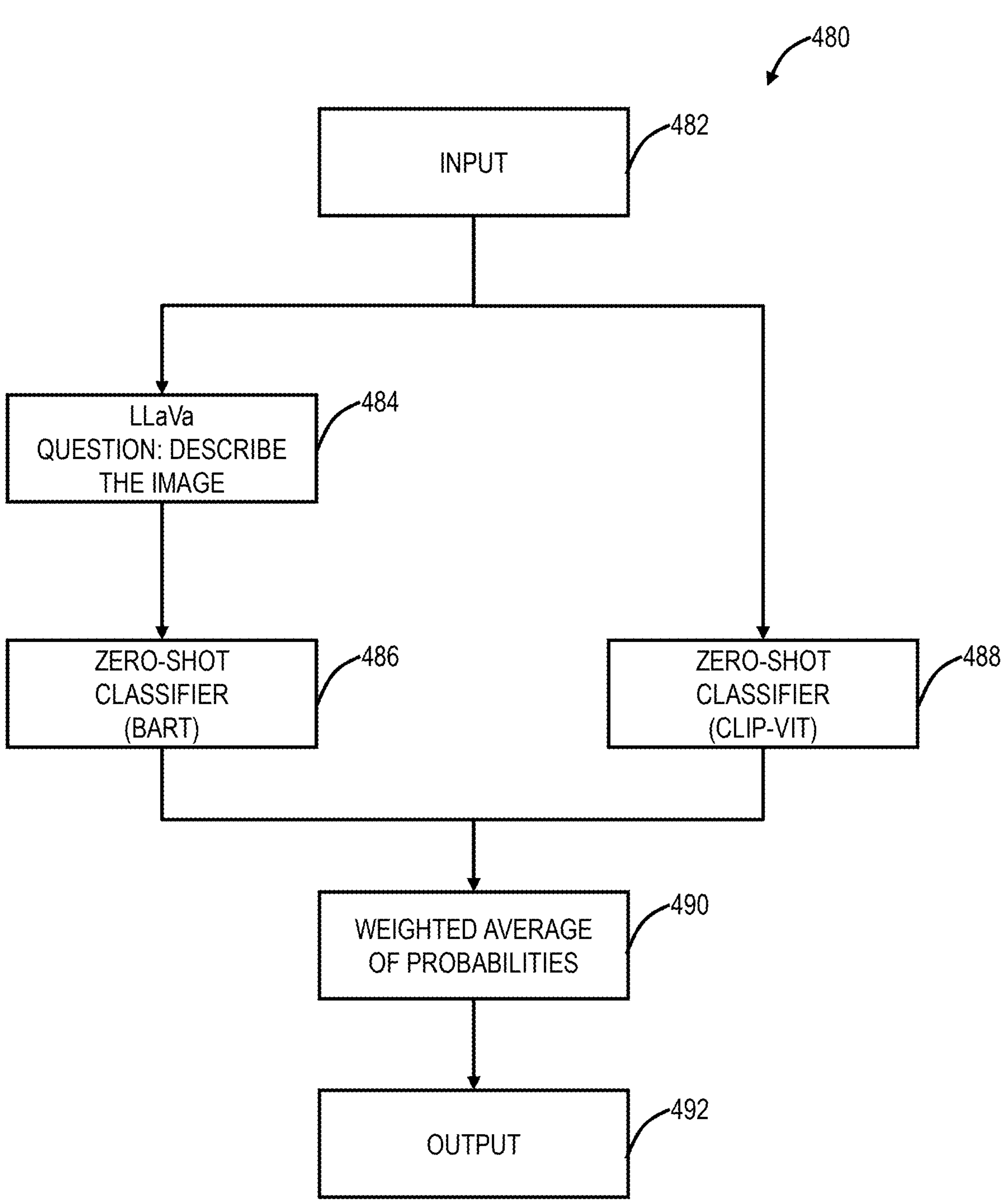
FIG. 8 is a flowchart of a process for an example implementation of the sensitive data classifier step of the multimodal DLP with artificial intelligence process of FIG. 6 using a combination of an LLM and zero-shot classifiers.

FIG. 8 is a flowchart of a process 480 for an example implementation of the sensitive data classifier step 454 using a combination of an LLM and zero-shot classifiers. The process 480 contemplates implementation as a method having steps, via computing resources configured to implement the steps, and as a non-transitory computer-readable medium with instructions that when executed cause one or more processors to implement the steps. The process 480 can be implemented with the multimodal DLP system 400, and practical implementations of the multimodal DLP system 400 and the processes 450, 480 can be through the network configurations 100A, 100B, 100C, and the like. That is, the process 480 contemplates use with any cybersecurity monitoring platform, appliance, service, etc.

The process 480 includes receiving an input (step 482) and both:

(1) processing the input with an LLM to describe the image (step 484) and processing the description with a zero-shot classifier (step 486). For example, LLaVa can be used as the LLM to describe the image and BART can be used as the zero-shot classifier.

(2) processing the input with a zero-shot classifier, such as CLIP-VIT (step 488).

The process 480 includes taking outputs of the two zero-shot classifier steps 486, 488, assigning a weighted average (step 490), and providing an output classification (step 492).

§ 4.6 Combination of CLIP Embedding and Supervised Learning Xgboost

Figure 9:
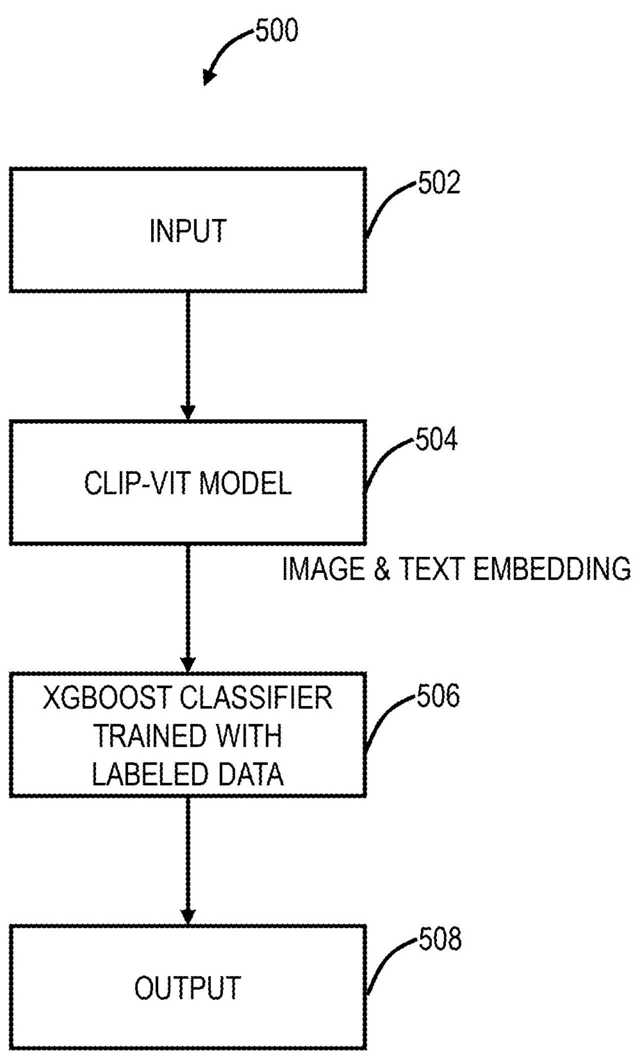
FIG. 9 is a flowchart of a process 500 for an example implementation of the sensitive content identifier of the multimodal DLP with artificial intelligence process of FIG. 6 using a combination of CLIP embedding and supervised learning XGboost.

FIG. 9 is a flowchart of a process 500 for an example implementation of the sensitive content identifier step 452 using a combination of CLIP embedding and supervised learning XGboost. The process 500 contemplates implementation as a method having steps, via computing resources configured to implement the steps, and as a non-transitory computer-readable medium with instructions that when executed cause one or more processors to implement the steps. The process 500 can be implemented with the multimodal DLP system 400, and practical implementations of the multimodal DLP system 400 and the processes 450, 480, 500 can be through the network configurations 100A, 100B, 100C, and the like. That is, the process 500 contemplates use with any cybersecurity monitoring platform, appliance, service, etc.

The process 500 includes receiving an input (step 502), processing the input with a CLIP-VIT model (step 504) to obtain image and text embeddings, processing the image and text embeddings with an XGboost classifier that was trained with labeled data (step 506), and providing an output (step 508).

FIG. 10 is a table of examples of categorization results using the process 500. Here, the process 500 is configured to categorize the input into one of 13 categories, e.g., finance, legal, etc. Note, the high values for both precision and recall. FIG. 11 is a table of examples of sub-category results.

In various embodiments, the following models were used herewith:

| task | model |
|---|---|
| Content extraction | LLaVa |
| | LLaVa + RAG |
| | BLIP |
| | Video-LLaMA |
| | OCR |
| Embedding | TF-IDF |
| | Bert |
| | Clip-Vit |
| Classification | Bart zero-shot classifier |
| | Clip-Vit zero-shot classifier |
| | XGboost |

§ 4.7 Latency Reduction of LLMs by Model Compression

The following table illustrates some example models, associated performance, and cost, for implementing the sensitive data classifier step 454. LLAVA+Zero Shot method uses pre-trained model to do classification. Clip Base/Large method does embeddings. Then we split data into train/test and build ML classifier with the embedding feature vectors.

| Model | Time to load (in secs) | Memory (in Gb) | Accuracy (in %) Train:Test 8:2 | Accuracy (in %) Train:Test 2:8 | Prediction Time (in secs) | Dollar cost (per image) |
|---|---|---|---|---|---|---|
| LLAVA + Zero Shot | 40 | 29 | 65 | 65 | 12.5 | $0.01 |
| Clip Base | 1.8 | 3.2 | 77 | 70 | 0.074 | $0.00007 |
| Clip Large | 3.5 | 3.6https://clip-as-service.jina.ai/user-guides/benchmark/ | 90 | 85 | 0.1 | $0.0001 |

§ 4.8 Multimodal DLP Process

Figure 12:
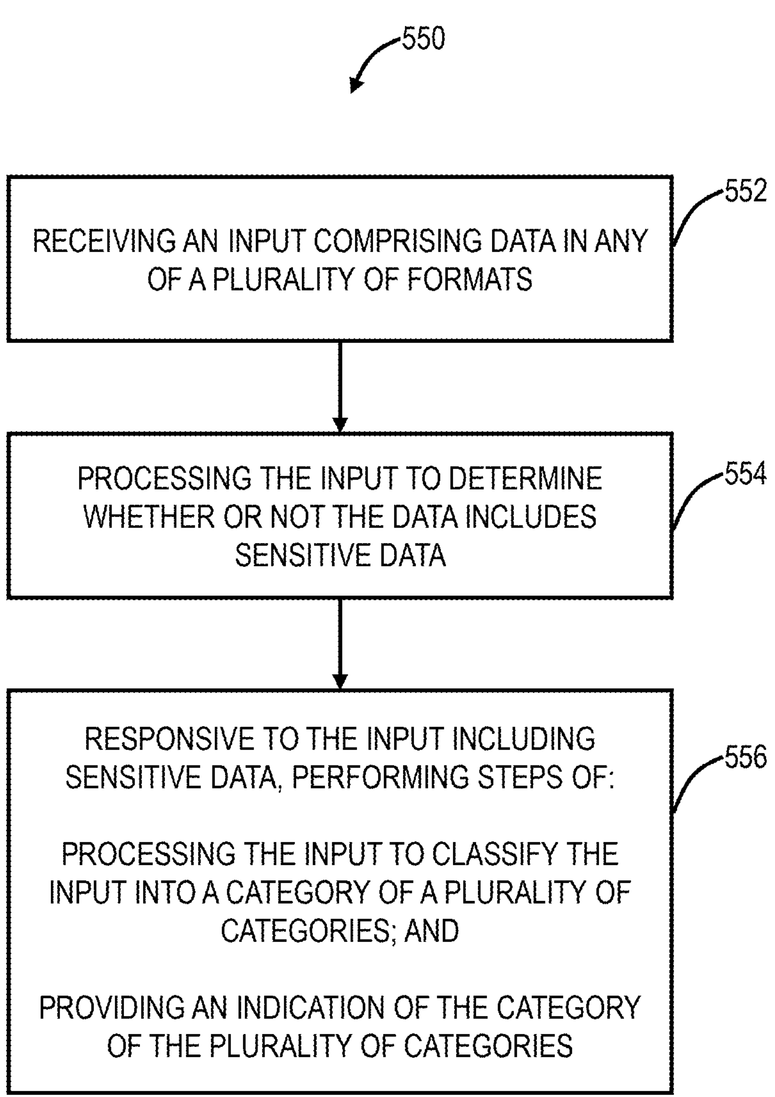
FIG. 12 is a flowchart of a process for multimodal DLP.

FIG. 12 is a flowchart of a process 550 for multimodal DLP. The process 550 contemplates implementation as a method having steps, via computing resources configured to implement the steps, and as a non-transitory computer-readable medium with instructions that when executed cause one or more processors to implement the steps. The process 550 can be implemented with the multimodal DLP system 400, and practical implementations of the multimodal DLP system 400 and the processes 450, 480, 500 550 can be through the network configurations 100A, 100B, 100C, and the like. That is, the process 550 contemplates use with any cybersecurity monitoring platform, appliance, service, etc.

The process 550 includes receiving an input comprising data in any of a plurality of formats (step 552); processing the input to determine whether or not the data includes sensitive data (step 554); and responsive to the input including sensitive data, performing steps of: processing the input to classify the input into a category of a plurality of categories; and providing an indication of the category of the plurality of categories (step 556).

The process 550 can further include, responsive to the input including non-sensitive data, providing an indication the data is non-sensitive, thereby either allowing the data in transit or not marking the data at rest. The process 550 can further include, responsive to the input including sensitive data, providing an indication of the category of the plurality of categories and a sub-category associated with the category.

The plurality of formats can include text formats, image formats, audio formats, video formats, source code, and a combination thereof. The processing the input to determine whether or not the data includes sensitive data can utilize (1) a Large Language Model (LLM) and embeddings and (2) a machine learning model configured for classification. The processing the input to classify the input into the category can utilize (1) a Large Language Model (LLM) and (2) a zero-shot classifier.

The processing the input to determine whether or not the data includes sensitive data and the processing the input to classify the input into the category both can utilize one or more machine learning models that were trained based on a set of training documents with labels. The process 550 can further include, prior to training the one or more machine learning models with the set of training documents with labels, identifying any mislabeled documents therein by performing Optical Character Recognition (OCR) and checking if associated keywords are present. The process 550 can further include, prior to training the one or more machine learning models with the set of training documents with labels, filtering out an images in the set of training documents with labels based on file size. The process 550 can further include, prior to training the one or more machine learning models with the set of training documents with labels, grouping images in the set of training documents with subtle differences based on a hash of the images.

§ 4.9 Multimodal DLP and Conventional DLP

The present disclosure presents various approaches for multimodal DLP with artificial intelligence. These techniques can be used in combination with existing DLP detection techniques, such as ones with DLP dictionaries. In an embodiment, the conventional DLP techniques can be used with the multimodal DLP with machine learning, to provide two answers which can be combined to give a final, more reliable answer (sensitive or not). In another embodiment, the multimodal DLP with machine learning and the conventional DLP techniques can be used to front end one another, i.e., either way, to reduce computational effort. For example, the sensitive content identifier step 452 can be used as a front end classifier to determine whether given content needs to be analyzed further, such as with DLP dictionaries, for improving efficiency and latency of DLP monitoring.

§ 4.10 Categorization

Conventional DLP approaches work by detecting specific pre-defined content whereas the approach described herein provides a classification and/or categorization of content. As described herein, the multimodal DLP with artificial intelligence process 450 can perform a classification with the sensitive content identifier step 452 that data is either sensitive or non-sensitive, and the sensitive data classifier step 454 can perform categorization into one of a plurality of categories. Advantages of this approach include the ability to detect classes and categories of documents without a need to provide sensitive data up-front, as well as improved accuracy, less false negatives or positives, and the like.

The categorization can be based on training as described herein. In an embodiment, the training can be performed by an entity hosting the model, referred to as a model creator. The model creator can use its own internal documents as well as publicly available documents in order to eliminate the need for companies to expose their sensitive documents. Specifically, the models are training on types of documents as opposed to specific content. In an embodiment, the categories can include immigration documents, corporate legal documents, court documents, legal documents, tax documents, insurance documents, invoice documents, resume documents, real estate documents, medical documents, technical documents, and finance documents. Of course, other categories are possible, based on the training data and associated labels. That is, the number of labels determines the number of categories. Further, an "others" category classification can exist for files/content that does not fall within the various categories.

§ 4.11 DLP Rules and Analytics

Again, the approach described herein can be used in combination with conventional DLP techniques, i.e., using dictionaries. This can enable a holistic approach for DLP monitoring in cybersecurity. Specifically, IT can gain insight into activity and spot issues where there are disconnects between data handling based on user function, in addition to stopping specific data from being exposed. With categories, DLP rules can be more than a single document contains sensitive information. Rather, there can be policies where someone's function is compared to their activities, e.g., someone in engineering should not be handling a large volume of HR documents and vice versa.

§ 4.12 Inline Multimodal DLP

The present disclosure provides various methods for streamlining the multimodal Data Loss Protection (DLP) processes described herein for better utilization in an inline manner. These methods are designed to enhance the efficiency and effectiveness of DLP systems that handle multiple types of data, such as text, images, audio, etc. Key aspects of these methods include optimizing data flow to ensure efficient management and protection of data from various sources without causing bottlenecks or delays and reducing processing latency through advanced algorithms to speed up data processing and threat detection. Enhanced real-time inference enables the DLP system to make quicker and more accurate classifications, ensuring immediate protection against data breaches and leaks, which is particularly important for inline applications where data needs to be protected as it is being transmitted or used. Improved preprocessing steps ensure that data is properly formatted and ready for analysis by the DLP system, with techniques for handling different data formats and ensuring data integrity before processing. Additionally, methods for training and adapting DLP models are included to recognize and protect against new and evolving threats, ensuring the system remains effective over time and can handle a wide variety of data types and scenarios. These methods are designed to integrate seamlessly with existing systems and workflows, allowing organizations to implement advanced DLP capabilities without significant disruption or overhaul of their current infrastructure. By focusing on these areas, the present disclosure aims to provide a comprehensive and effective approach to multimodal DLP, enabling better protection of sensitive data in a wide range of real-world applications.

In addition to the models (1)-(5) described above, the use of the BERT model is contemplated in various embodiments. BERT or Bidirectional Encoder Representations from Transformers created new benchmarks in multiple NLP tasks. This was due to the bidirectional nature of contextual understanding. The model, besides using text preprocessing, also tries to capture meaning from unseen words using WordPiece Tokenizer, making it a go-to choice for even noisy data. Again, as described herein, the various models used by the present systems can be trained with specific data, or be pre-trained. The various modifications described herein can then be made to the models utilized by the systems.

words to their root form. The following table illustrates the impact of such methods on a model's prediction accuracy, the example model being the BERT model.

| | BERT | BERT (with reduced vocabulary) |
|---|---|---|
| Prediction accuracy | 69% | 71% |
| Vocabulary file | 30,522 words | 12,760 words |

Additionally, in various embodiments, to further reduce latency while retaining prediction accuracy, the methods can include modifying a model by enforcing lower and upper text-byte thresholds and text processing stopping points. A lower text-byte threshold can be employed to cause the model to skip files below this threshold and classify them as miscellaneous or "other". An upper text-byte threshold can be enforced to cause a model to extract only up to this specified amount of text for input into the prediction model. Finally, a defined early stopping k value determines the stopping point for text processing and vocabulary mapping iterations. That is, this innovative approach can be employed to speed up the text vocabulary mapping by only iterating k tokens. The following table shows iteration times associated with a plurality of file types and a plurality of specified early stopping k values.

| File | Processing time with no optimization | Processing time with k = 1000 | Processing time with k = 500 |
|---|---|---|---|
| Unicode, 105,801 | 12.20913333 (ms) | 0.205729 (ms) | 0.1269013333 (ms) |
| Emojis, 85,021 | 8.64395 (ms) | 0.149041 (ms) | 0.112933 (ms) |
| Quaran, Arabic, 2,157,401 words | 187.1666667 (ms) | 0.1434073333 (ms) | 0.1022473333 (ms) |
| Don Quie Hote, Spanish, 1,877,151Words | 1.498093333 (ms) | 0.6082473333 (ms) | 0.3971176667 (ms) |
| Bhavagad Gita, Sanskrit, 13,011,401 words | 18.8027 (ms) | 0.1797483333 (ms) | 0.1377733333 (ms) |

In various embodiments, the present inline multimodal DLP techniques include modifying one or more models to reduce latency while retaining prediction accuracy. This is referred to herein as one or more modifications to the models used in the present multimodal DLP system described herein. The various modifications are further described herein with provided test results.

In various embodiments, one modification can include reducing a models vocabulary. For example, the BERT Tiny model vocabulary can be simplified in order to reduce latency. Further, introducing file size thresholds can further reduce latency while retaining prediction accuracy. For image and text classification, the BERT Tiny model can be fine-tuned for text classification, while the Vision Transformer (ViT) Tiny model can be fine-tuned for image classification. Such models can further be utilized in a composite manner as further described herein.

Figure 13:
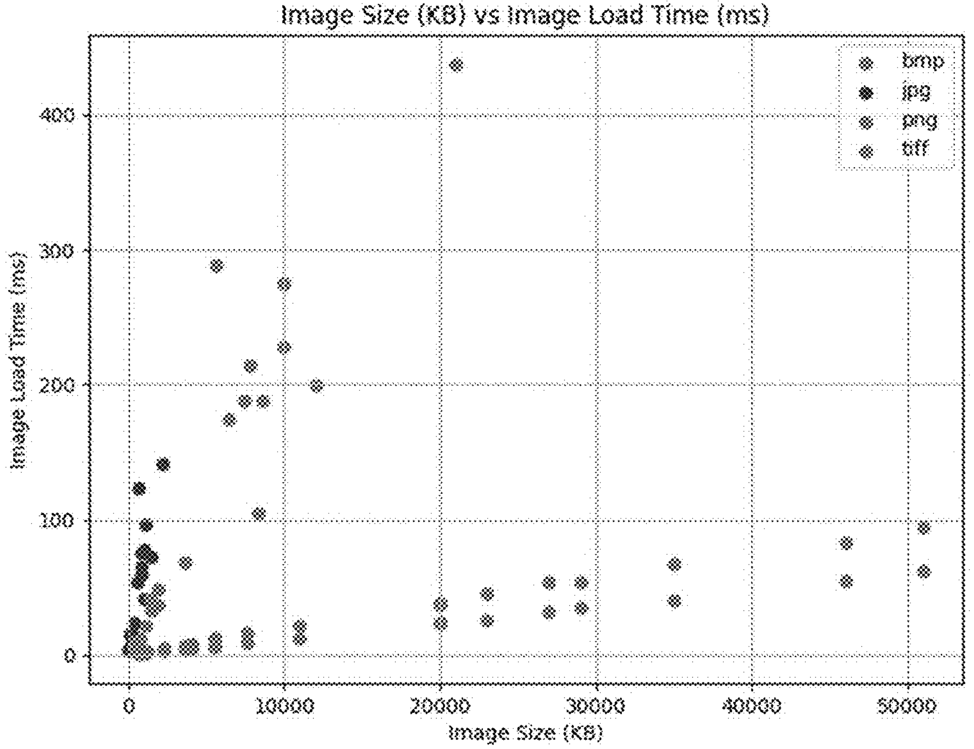
FIG. 13 is a diagram representing image size vs load time for a plurality of image file types.
Figure 14:
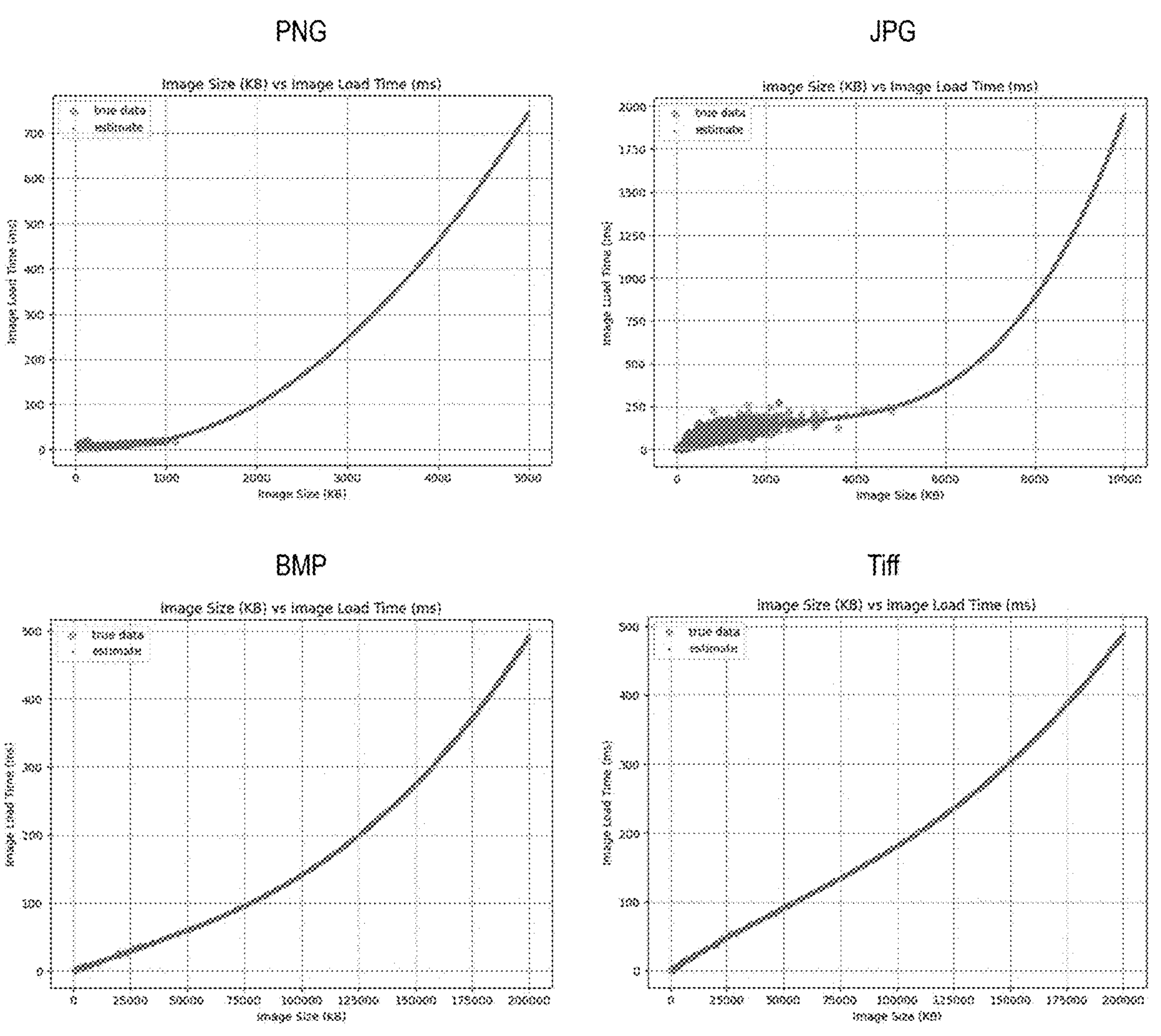
FIG. 14 is a plurality of estimated load time vs image size trend graphs for various image file types.

As stated, the various models described herein can be simplified with one or more modifications to reduce latency and retain prediction accuracy. Such methods are employed to speed up text pre-processing without sacrificing the prediction accuracy. These methods include the aspects of removing, from the model's vocabulary, non-English words, removing stop words, and lemmatization, i.e., reducing Further, in various embodiments, for image processing models such as ViT and the like, an input file size maximum can be enforced to control latency. These methods include the utilization of polynomial regression to predict a trend and estimate the thresholds. This is necessary because different image file types incur different load times. FIG. 13 is a diagram representing image size vs load time for a plurality of image file types. As can be seen, load times are not directly related to image size across different image file types. FIG. 14 shows a plurality of estimated load time vs image size trends for various image file types, the estimated load time vs image size trends being determined based on polynomial regression or other methods of the like. Based on these trends, the thresholds can be determined and enforced for each image file size based on image file type. For example, an image file size threshold can be enforced, where an image file having a size above a determined threshold will not be processed. Again, this threshold can be based on the image file type as described because of the different load time characteristics associated with each of the various image file types. That is, the thresholds can be based on a set load time, where the file size threshold can be determined from the estimated trends for each image file type.

Figure 15:
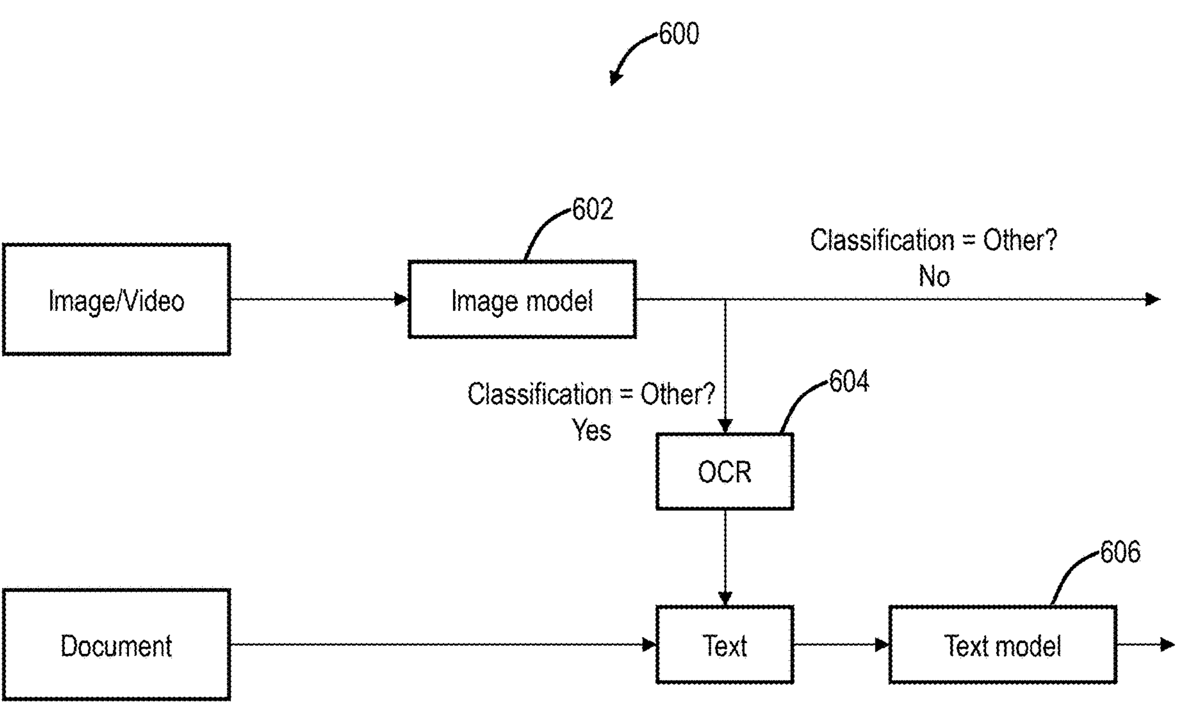
FIG. 15 is a flow diagram of a composite text and image classification architecture.

Further, in various embodiments, a composite text and image classification method is contemplated. More specifically, a composite BERT and ViT model architecture is utilized for more efficient text and image classification. FIG. 15 is a flow diagram of a composite text and image classification architecture 600. The composite text and image classification architecture 600 shown in FIG. 15 operates based on a classification generated by an image model 602. If the image model produces a classification prediction of "other" the image will be passed to an OCR engine 604 and then text will be extracted, and subsequently processed by the text model 606. For text based documents, text will be fetched directly and passed to the text model 606. This will allow it to leverage high accuracies of individual models, customize post processing steps of each model, and decrease OCR calls by categorizing image data first.

As described, the image model 602 shown in FIG. 15 can include the ViT model while the text model 606 can include the BERT model described herein, although, the composite architecture can be utilized with any model described herein for text and image processing. Further, these models can include any of the modifications described in the present disclosure for reducing latency while retaining accuracy of classifications.

As stated, the inline multimodal DLP systems can be utilized for production data inline. That is, through the network configurations 100A, 100B, 100C, and the like for processing data flowing through the cloud 120, i.e., as part of the inline monitoring described herein.

Figure 16:
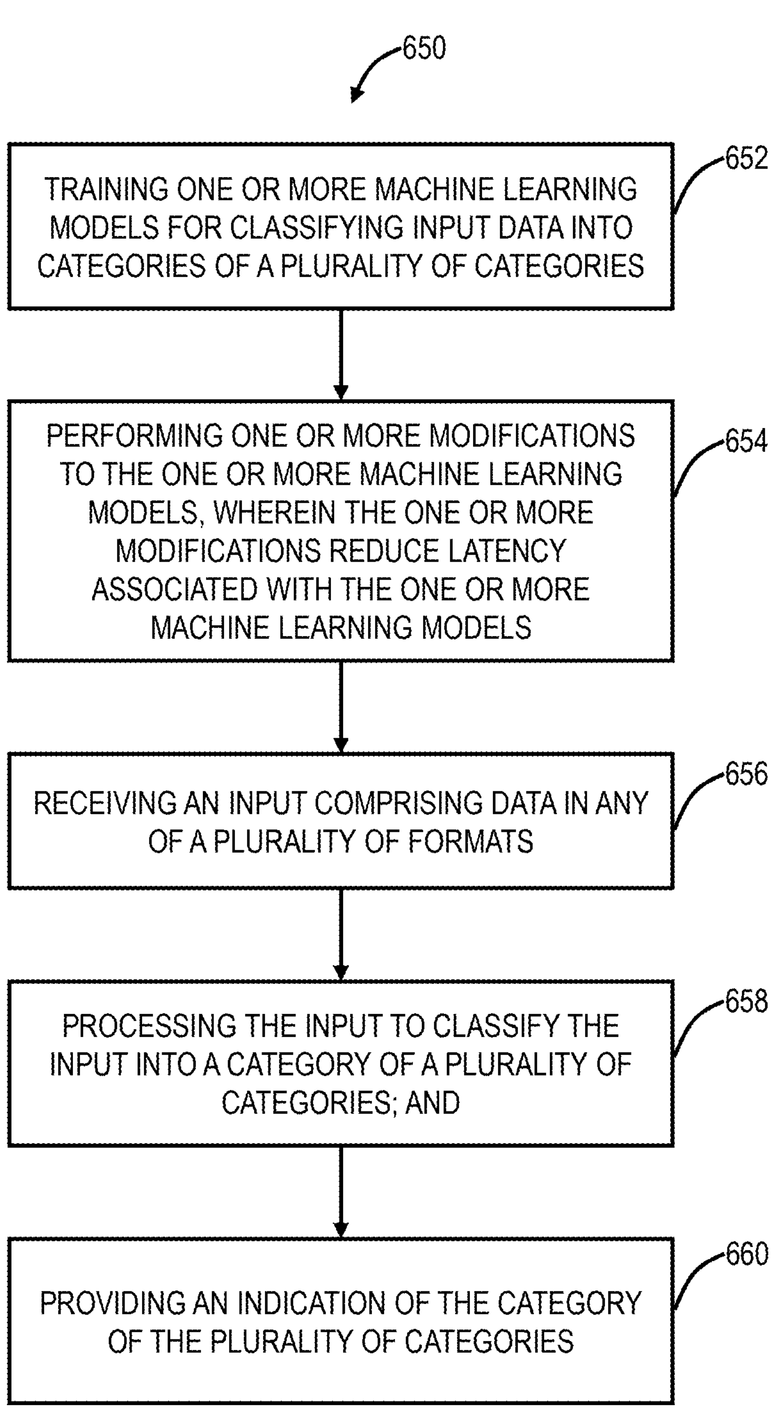
FIG. 16 is a flowchart of a process for inline multimodal DLP.

FIG. 16 is a flowchart of a process 650 for inline multimodal DLP. The process 650 contemplates implementation as a method having steps, via computing resources configured to implement the steps, and as a non-transitory computer-readable medium with instructions that when executed cause one or more processors to implement the steps. The process 650 can be implemented with the multimodal DLP system 550, 400, and practical implementations of the multimodal DLP system 400 and the processes 450, 480, 500 550 can be through the network configurations 100A, 100B, 100C, and the like. That is, the process 650 contemplates use with any cybersecurity monitoring platform, appliance, service, etc.

The process 650 includes training one or more machine learning models for classifying input data into categories of a plurality of categories (step 652); performing one or more modifications to the one or more machine learning models, wherein the one or more modifications reduce latency associated with the one or more machine learning models (step 654); receiving an input comprising data in any of a plurality of formats (step 656); processing the input to classify the input into a category of a plurality of categories (step 658); and providing an indication of the category of the plurality of categories (step 660).

The process 650 can further include wherein the one or more modifications include any of removing, from the one or more machine learning model's vocabulary, non-English words, removing stop words, and performing lemmatization. The one or more modifications can include any of enforcing a lower text-byte threshold, an upper text-byte threshold, and an early stopping k value. The one or more modifications can include enforcing an input file size maximum. The input file size maximum can be based on a file type of the input. The input file size maximum can be determined based on one or more estimated load time vs image size trend graphs. The one or more machine learning models can include an image classification model and a text classification model, and wherein the steps further include: responsive to the image model producing a classification prediction of "other", extracting text from the image via an Optical Character Recognition (OCR) engine; and processing the extracted text via the text classification model. The steps can further include processing the input to determine whether or not the data includes sensitive data prior to processing the input for classification. The plurality of formats can include text formats, image formats, audio formats, video formats, source code, and a combination thereof. The steps can further include, prior to training the one or more machine learning models with the set of training documents with labels, identifying any mislabeled documents therein by performing Optical Character Recognition (OCR) and checking if associated keywords are present.

§ 5.0 Knowledge Distillation and LLMs for Document Classification

As described, the present DLP processes include the utilization of various models for both detecting sensitive data and classifying sensitive data. These models can be optimized in various ways such as the various mechanisms also described herein. The present disclosure provides further optimizations to these models to ensure efficiency, high performance, and small model sizes for easier deployment and reliability. In various embodiments, the present methods further include the development of LLMs for document classification.

In various embodiments, knowledge distillation is used to create an efficient model that is adapted to perform well despite using fewer computational resources. Further, selection and utilization of high-grade, relevant data points to maximize the efficiency of the knowledge distillation process is implemented.

Knowledge distillation is a process designed to transfer the extensive knowledge of a large, complex model to a smaller, more lightweight model for producing a small, distilled model. In the realm of machine learning, larger models typically possess a multitude of learnable parameters, enabling them to achieve superior performance across various tasks. Conversely, smaller models are characterized by a reduced parameter count, often sacrificing performance for efficiency. This discrepancy persists even when both models are trained on identical datasets, highlighting the challenge of achieving comparable performance in resource-constrained scenarios. Knowledge distillation serves as a bridge between these contrasting model sizes, allowing the smaller "student" model to not only learn from the dataset but also replicate the formidable performance achieved by its larger "teacher" counterpart.

By distilling the essence of the teacher model's knowledge into a more compact form, the student model gains access to a wealth of insights, empowering it to refine its predictions and decision-making processes. This deeper understanding ultimately yields more accurate and reliable results, enabling the student model to achieve performance levels that rival those of its larger mentor. Moreover, knowledge distillation plays a crucial role in the development of task-specific versions of larger models tailored for deployment in real-world environments.

Figure 17:
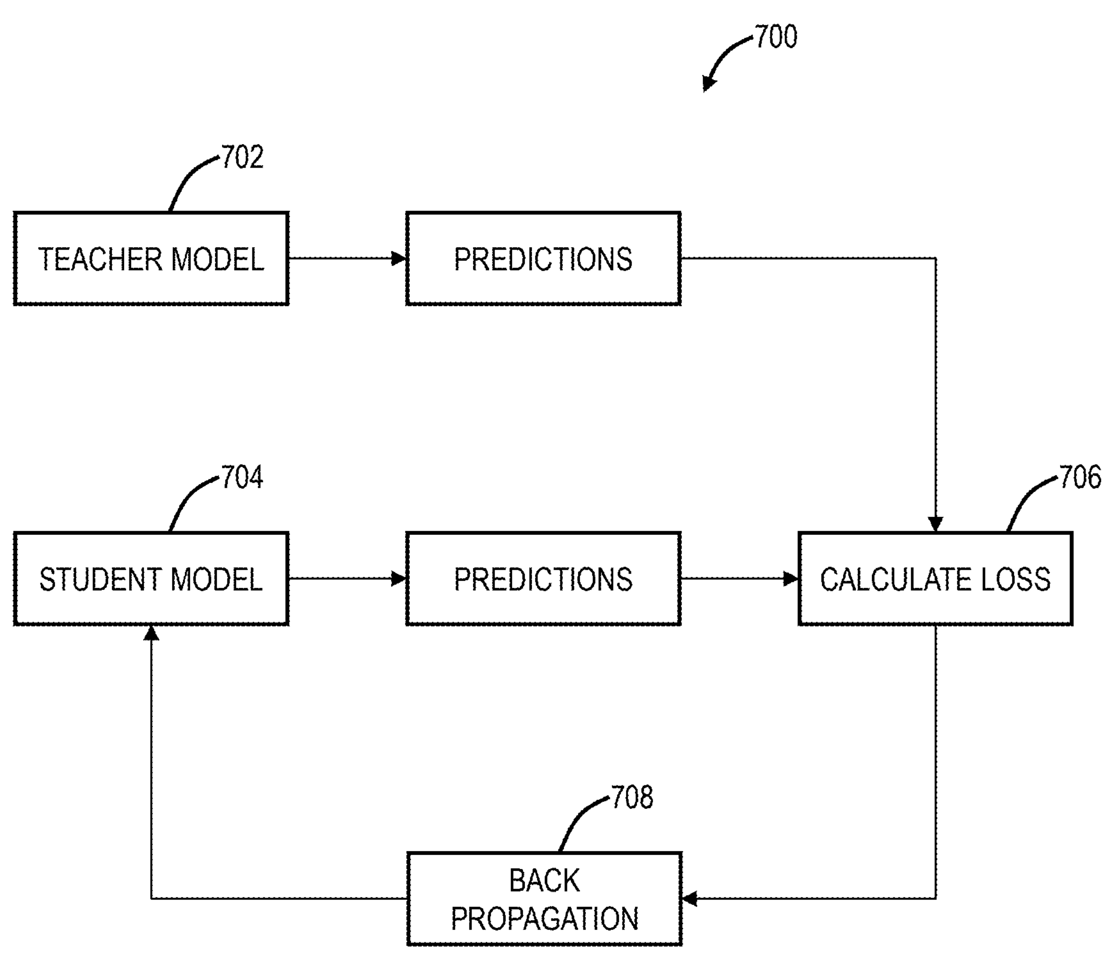
FIG. 17 is a flow diagram of a knowledge distillation method.

FIG. 17 is a flow diagram of a knowledge distillation process 700. The process 700 includes obtaining predictions from a teacher model 702. Predictions are also obtained from a student model 704. These predictions can be document classification predictions as described herein, or any other output that can be generated by an LLM. Again, the teacher model 702 is a large model when compared to the smaller student model 704. The predictions from the teacher model 702 and the student model 704 are then compared to determine how different they are, this is described as calculating loss 706 between the two models. Calculating the loss can be contemplated as adding the difference between the teacher model and the student model. This information is then fed back into the student model via back propagation 708, thereby allowing the student model 704 to learn from its mistakes and attempt to replicate the teacher model 702. In various embodiments, the resulting model is referred to as a distilled model. That is, the optimized student model is referred to as a distilled model.

Figure 18:
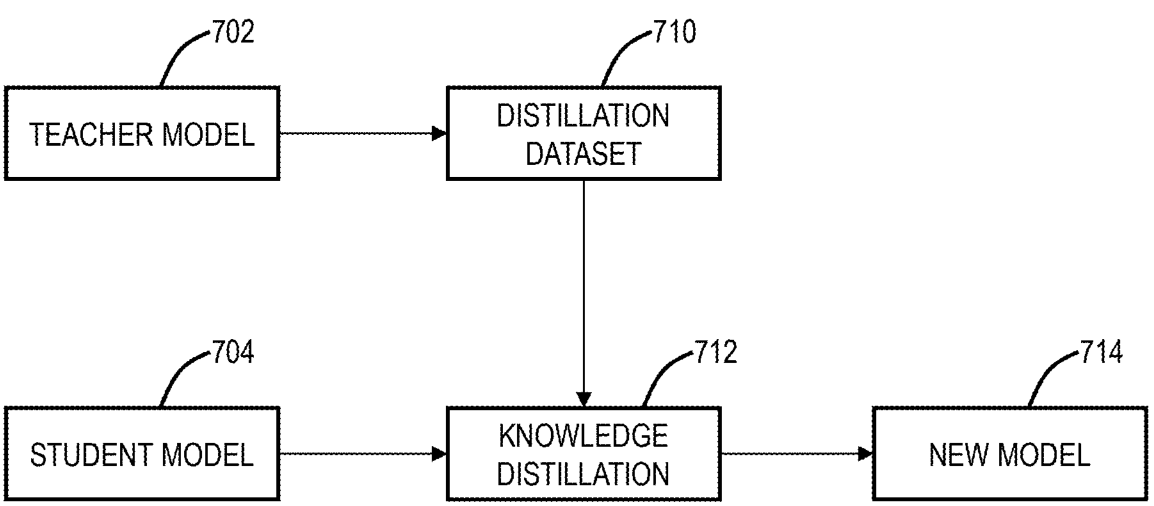
FIG. 18 is a flow diagram of the implementation of knowledge distillation within the present systems and methods.

FIG. 18 is a flow diagram of the implementation of knowledge distillation within the present systems and methods. The teacher model 702 is used to make predictions on a public dataset, for example a dataset which includes various inputs associated with various categories. These predictions are stored as a distillation dataset 710. Next, the student model 704 and the distillation dataset are utilized to perform the knowledge distillation 712. This allows the systems to create a new model 714 for use in classification. The distillation dataset 710 is contemplated as the outputs of the teacher model, where the differences to the output of a student model are utilized as described herein to perform knowledge distillation.

Figure 19:
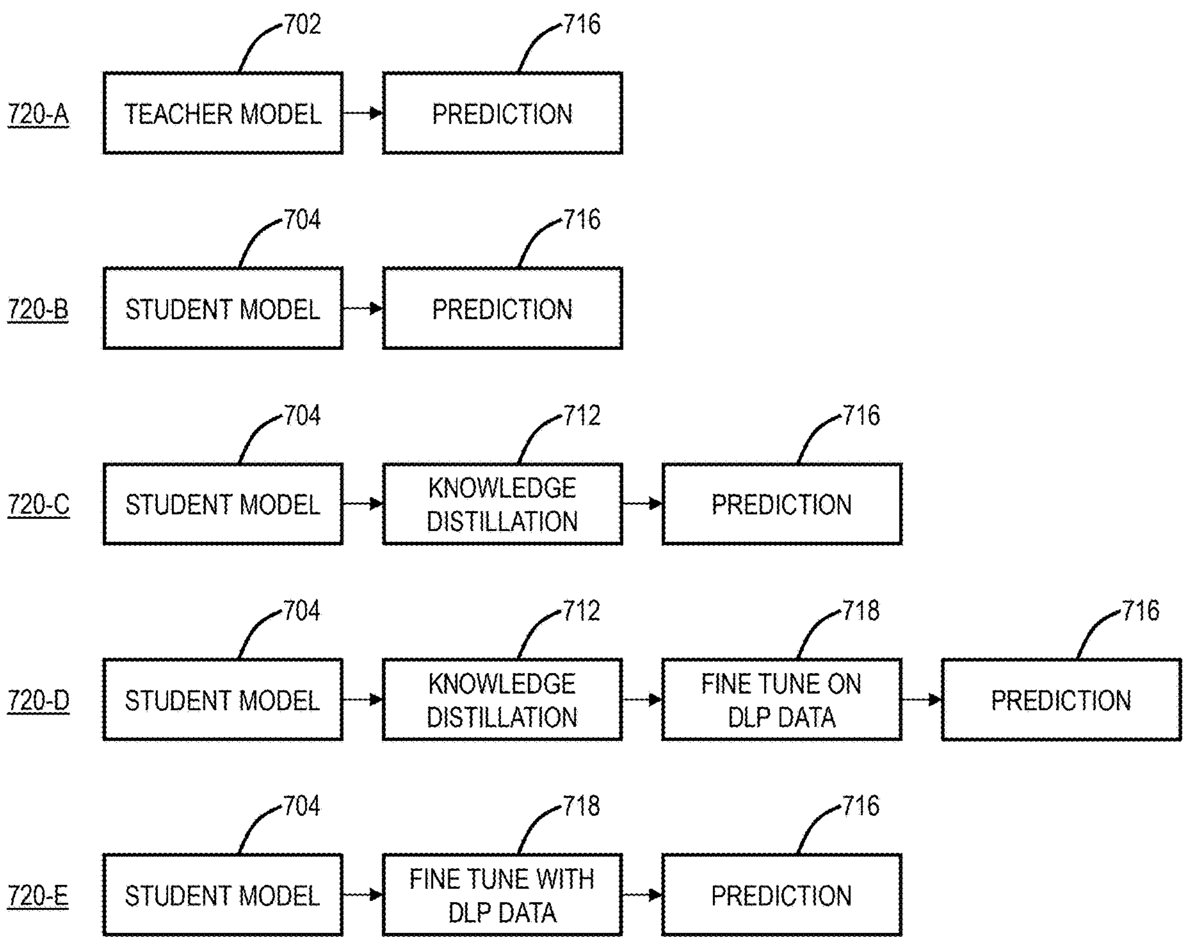
FIG. 19 is a flow diagram representing a plurality of experiments performed utilizing different methods for optimizing a model for content classification

FIG. 19 represents a plurality of experiments performed utilizing different methods for optimizing a model for content classification. In a first method 720-A, the teacher model 702 was used to make predictions 716 on a DLP dataset. In a second method 720-B, the student model 704 was used to make predictions 716 on the DLP dataset. In a third method 720-C, the student model 704 was optimized via knowledge distillation 712, and then utilized to make predictions 716 on the DLP dataset. In a fourth method 720-D, the student model 704 was optimized via knowledge distillation 712, then fine tuned 718 on DLP data, and then utilized to make predictions 716 on the DLP dataset. Finally, in a fifth method 720-E, the student model 704 was only fine tuned 718 with DLP data, and then utilized to make predictions 716 on the DLP dataset.

Based on these various methods, the following accuracy measurements were derived, [first method 720-A, 48.4%], [second method 720-B, 12.8%], [third method 720-C, 15%], [fourth method 720-D, 53%], [fifth method 720-E, 52.3%]. Again, these accuracy measurements are relative to the percentage of correct classifications that each model was able to provide after their respective optimization methods. Based thereon, it can be seen that using only the teacher model 702 yields an accuracy of 48.4%, while only using the unoptimized student model 704 yields an accuracy of 12.8%. Again, the aim of the present disclosure is to reduce the size of the models used in production, thus, utilizing the teacher model is undesirable. Further, it can be seen that purely utilizing knowledge distillation 712 only slightly increases the accuracy of the student model from 12.8% to 15%, while utilizing a combination of knowledge distillation 712 and fine tuning 718 yields a much more acceptable accuracy of 53%. Again, this accuracy is achieved with the optimized student model 704 which is much smaller in size than the teacher model. Additionally, it can be seen that the accuracy difference between only using fine tuning 718 and the combination of knowledge distillation 712 and fine tuning 718 is minimal, although a closer look at the precision, recall, and scores for particular content categories provides further details.

FIG. 20 is a comparison of category classification metrics between a fine tuned model and a model which incurred knowledge distillation and fine tuning. It can be seen that the precision metric increases by a substantial amount from 55% to 64% when the combination of knowledge distillation 712 and fine tuning 718 is utilized as opposed to only fine tuning. Thus, anything being classified by the model that is optimized via the combination of knowledge distillation 712 and fine tuning 718 is improved by 9% on average. Further, an increase in F1 for 8 out of 12 categories in the DLP dataset is also seen.

Further, in various embodiments, the utilization of custom datasets is contemplated. Typically, only public/general datasets are utilized to train models and/or utilized in the knowledge distillation process. The present systems and methods include analyzing the shortcomings of the teacher model 702. For example, the teacher model may perform very well for certain categories, but not ideally for other categories. Based thereon, a synthetic dataset is created for the categories in which the teacher model performs well, i.e., the synthetic dataset is generated based on the teacher model's strengths. This synthetic dataset can be created with the use of an LLM. This can be done by querying an LLM to create specific data relating to the categories in which the teacher model performs well. For example, an LLM can be asked to create a specific number of resume documents, tax documents, etc. This synthetic data is then passed through the teacher model to provide predictions which are then stored within the distillation dataset 710. The student model can then be trained with this distillation data for such category specific data.

In various embodiments, a plurality of teacher models, each having strengths in different categories, can be utilized to create a well-rounded distillation dataset. That is, each teacher model can be exposed to category-specific data associated with its strengths, and the resulting predictions can be combined into a single distillation dataset to optimize a single student model.

FIG. 21 is a diagram showing the performance of a standard student model and a standard teacher model. Standard meaning the models are trained with general, non-synthetic data, i.e., a general Data Loss Protection (DLP) dataset. The outputs/predictions generated by these models can be contemplated as general data predictions. It can be seen that the student model performs at 35% accuracy, while the teacher model performs at 67% accuracy. It can also be seen that other than 3 of the categories, the model performs relatively well. For example, in the automobile category, the student model performed with a 38% accuracy, while the teacher model performed with a 85% accuracy. Based thereon, a synthetic dataset is created for the automobile category in addition to all other well-performing categories. Again, this synthetic data is further utilized to create a distillation dataset which can be used to optimize the student model. In various embodiments, "well-performing" categories can be determined based on an accuracy threshold.

FIG. 22 is a diagram comparing the performance of a student model optimized via various methods. The different methods highlighted in FIG. 22 include a standard "unoptimized" student model 802, a student model distilled with general data 804, i.e., data that does not include category-specific synthetic data, a student model distilled with category-specific data 806, and a student model distilled with category-specific data and general data 808. Again, the standard student model experiences an accuracy of 35%. When the student model is distilled with general data, the accuracy increases to 37%. However, when utilizing only the category-specific synthetic data, the accuracy increases to 39%. Similarly, the student model distilled with category-specific data and general data also exhibits an accuracy of 39%. It shall be noted that, in the present example, the general dataset includes 5000 data points while the category-specific synthetic data includes only 90 data points. Thus, it is much more efficient and beneficial to utilize the category-specific synthetic data.

Based on the described processes, various embodiments of the present disclosure utilize a combination of knowledge distillation and fine tuning for optimizing a student model. The fine tuning can include creating category-specific synthetic data and feeding this synthetic data to a teacher model for generating synthetic data predictions and creating a distillation dataset including those synthetic data predictions. This "tuned" distillation dataset can then be used to distill a student model and create a distilled model, thereby allowing the present DLP systems to use a much smaller model in production for performing content classification.

It will be appreciated that the present model optimization processes can be used to create optimized models to be utilized within any of the DLP processes described herein, for example, process 450, 480, 500, 550, and 650. Additionally, the optimizations described in the present disclosure can be combined with additional optimizations such as the optimizations described in process 650. Further, it will be known to one of skill in the art that the model optimization processes described herein can be utilized to optimize models outside of the DLP use cases described herein. that is, such processes can be utilized to optimize models for performing a wide variety of tasks, and are not limited to content classification models.

By utilizing the present systems and methods, it is possible to increase the performance of smaller models. The effectiveness of smaller models can be further enhanced by utilizing larger distillation datasets, more category-specific datasets, and even larger and more accurate teacher models. Again, the discussed methods are based on DLP datasets, although these techniques can be used in any domain of LLMs. Currently, most of the available high accuracy LLMs are relatively large and not adequate for customer centric user experience. However, by utilizing the present systems and methods, smaller, faster, and more accurate models can be built.

§ 5.1 Process for LLM Knowledge Distillation

Figure 23:
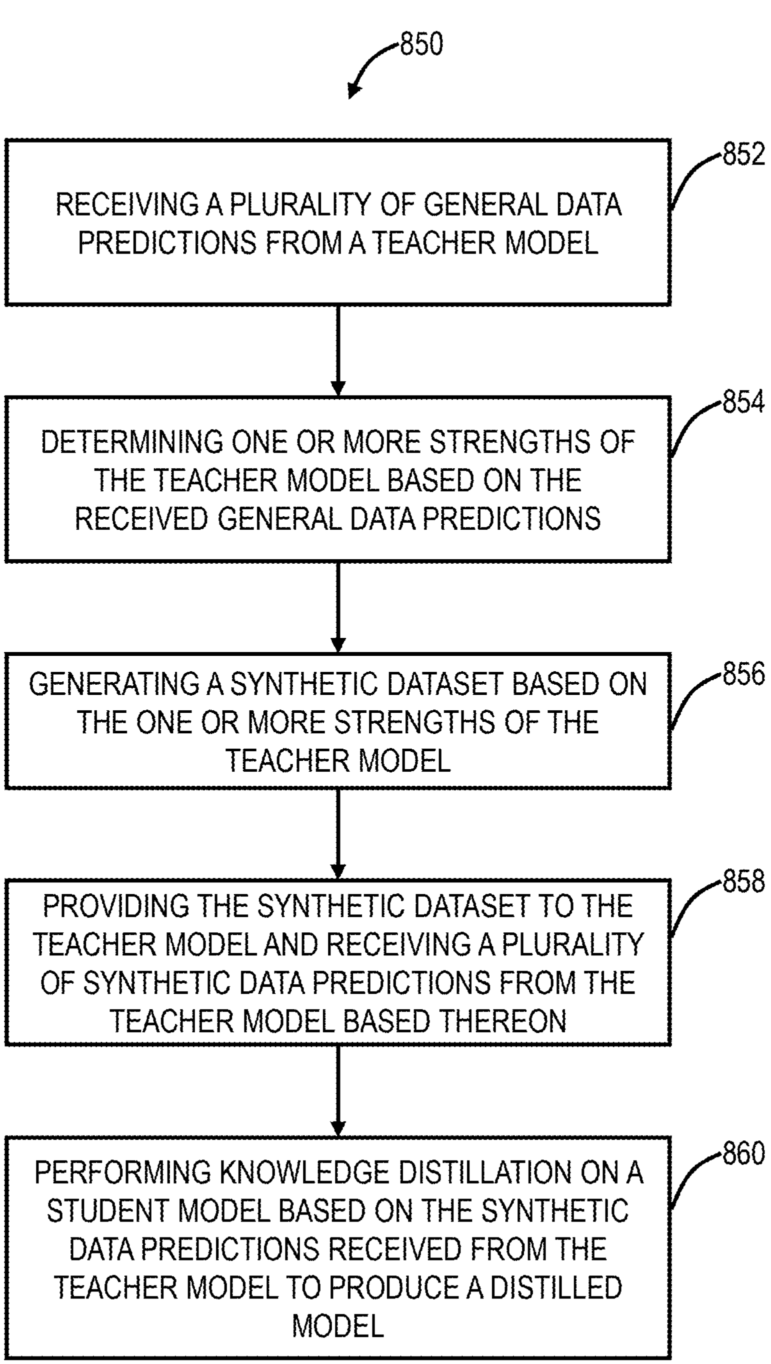
FIG. 23 is a flowchart of a process 850 for LLM knowledge distillation for Data Loss Protection (DLP).

FIG. 23 is a flowchart of a process 850 for LLM knowledge distillation for Data Loss Protection (DLP). The process 850 contemplates implementation as a method having steps, via computing resources configured to implement the steps, and as a non-transitory computer-readable medium with instructions that when executed cause one or more processors to implement the steps. The process 850 can be implemented with the multimodal DLP system 550, 400, and practical implementations of the multimodal DLP system 400 and the processes 450, 480, 500, 550, and 650 can be through the network configurations 100A, 100B, 100C, and the like. That is, the process 850 contemplates use with any cybersecurity monitoring platform, appliance, service, etc.

The process 850 includes receiving a plurality of general data predictions from a teacher model (step 852); determining one or more strengths of the teacher model based on the received general data predictions (step 854); generating a synthetic dataset based on the one or more strengths of the teacher model (step 856); providing the synthetic dataset to the teacher model and receiving a plurality of synthetic data predictions from the teacher model based thereon (step 858); and performing knowledge distillation on a student model based on the synthetic data predictions received from the teacher model to produce a distilled model (step 860).

The process 850 can further include wherein the teacher model and the student model are Large Language Models (LLMs). Prior to receiving the plurality of general data predictions from the teacher model, the steps can include providing, to the teacher model, a general Data Loss Protection (DLP) dataset. The plurality of general data predictions and plurality of synthetic data predictions can include content category classification predictions. Determining the one or more strengths of the teacher model can include determining one or more categories in which the teacher model performs classification with an accuracy above a threshold. Generating the synthetic dataset can include utilizing a Large Language Model (LLM) to generate a plurality of inputs associated with the one or more strengths of the teacher model, wherein the synthetic dataset includes the plurality of inputs. The steps can further include utilizing the distilled model in production for classifying inputs to a Data Loss Protection (DLP) system. The steps can further include receiving an input comprising data in any of a plurality of formats; processing the input via the distilled model to classify the input into a category of a plurality of categories; and providing an indication of the category of the plurality of categories. The steps can further include processing the input to determine whether or not the data includes sensitive data prior to processing the input for classification. The plurality of formats can include text formats, image formats, audio formats, video formats, source code, and a combination thereof.

§ 6.0 Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on data as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, etc. described herein contemplate use in any and all combinations with one another, including individually as well as combinations of less than all of the various elements, operations, steps, methods, processes, algorithms, functions, techniques, etc.

What is claimed is:

1. A method comprising steps of:

receiving a plurality of general data predictions from a teacher model on a labeled Data Loss Protection (DLP) dataset comprising a plurality of content categories;

determining one or more strengths of the teacher model based on the received general data predictions by computing, for each of the plurality of content categories, a category-specific classification accuracy of the teacher model relative to labels in the labeled DLP dataset and selecting one or more well-performing categories having the category-specific classification accuracy above a threshold;

generating a synthetic dataset based on the one or more strengths of the teacher model by querying a Large Language Model (LLM) to generate category-specific synthetic documents corresponding to the selected one or more well-performing categories;

providing the synthetic dataset to the teacher model and receiving a plurality of synthetic data predictions from the teacher model based thereon; and performing knowledge distillation on a student model based on the synthetic data predictions received from the teacher model to produce a distilled model for content-category classification in a DLP system.

2. The method of claim 1, wherein determining the one or more strengths comprises determining respective strengths of a plurality of teacher models in different categories, and wherein providing the synthetic dataset to the teacher model comprises providing first category-specific synthetic documents to a first teacher model and second category-specific synthetic documents to a second teacher model, and combining corresponding synthetic data predictions from the plurality of teacher models into a single distillation dataset used to perform the knowledge distillation on the student model.

3. The method of claim 1, wherein prior to receiving the plurality of general data predictions from the teacher model, the steps comprise providing, to the teacher model, a general DLP dataset.

4. The method of claim 1, wherein the plurality of general data predictions and plurality of synthetic data predictions comprise content category classification predictions.

5. The method of claim 4, wherein determining the one or more strengths of the teacher model comprises (i) evaluating, for each content category, the teacher model's classification accuracy using labels of the general Data Loss Protection (DLP) dataset, and (ii) determining one or more categories in which the teacher model performs classification with an accuracy above a threshold.

6. The method of claim 1, wherein generating the synthetic dataset comprises utilizing an LLM to generate a plurality of inputs associated with the one or more strengths of the teacher model, wherein the synthetic dataset comprises the plurality of inputs.

7. The method of claim 1, wherein the steps further comprise:

utilizing the distilled model in production for classifying inputs to a DLP system.

8. The method of claim 1, wherein the steps further comprise:

receiving an input comprising data in any of a plurality of formats;

processing the input via the distilled model to classify the input into a category of a plurality of categories; and providing an indication of the category of the plurality of categories.

9. The method of claim 8, wherein the steps further comprise:

processing the input to determine whether or not the data includes sensitive data prior to processing the input for classification.

10. The method of claim 8, wherein the plurality of formats comprise text formats, image formats, audio formats, video formats, source code, and a combination thereof.

11. A non-transitory computer-readable medium comprising instructions that, when executed, cause one or more processors to perform steps of:

receiving a plurality of general data predictions from a teacher model on a labeled Data Loss Protection (DLP) dataset comprising a plurality of content categories;

determining one or more strengths of the teacher model based on the received general data predictions by computing, for each of the plurality of content categories a category-specific classification accuracy of the teacher model relative to labels in the labeled DLP dataset and selecting one or more well-performing categories having the category-specific classification accuracy above a threshold;

generating a synthetic dataset based on the one or more strengths of the teacher model by querying a Large Language Model (LLM) to generate category-specific synthetic documents corresponding to the selected one or more well-performing categories;

providing the synthetic dataset to the teacher model and receiving a plurality of synthetic data predictions from the teacher model based thereon; and performing knowledge distillation on a student model based on the synthetic data predictions received from the teacher model to produce a distilled model for content-category classification in a DLP system.

12. The non-transitory computer-readable medium of claim 11, wherein determining the one or more strengths comprises determining respective strengths of a plurality of teacher models in different categories, and wherein providing the synthetic dataset to the teacher model comprises providing first category-specific synthetic documents to a first teacher model and second category-specific synthetic documents to a second teacher model, and combining corresponding a synthetic data predictions from the plurality of teacher models into a single distillation dataset used to perform the knowledge distillation on the student model.

13. The non-transitory computer-readable medium of claim 11, wherein prior to receiving the plurality of general data predictions from the teacher model, the steps comprise providing, to the teacher model, a general DLP dataset.

14. The non-transitory computer-readable medium of claim 11, wherein the plurality of general data predictions and plurality of synthetic data predictions comprise content category classification predictions.

15. The non-transitory computer-readable medium of claim 14, wherein determining the one or more strengths of the teacher model comprises (i) evaluating, for each content category, the teacher model's classification accuracy using labels of the general Data Loss Protection (DLP) dataset, and (ii) determining one or more categories in which the teacher model performs classification with an accuracy above a threshold.

16. The non-transitory computer-readable medium of claim 11, wherein generating the synthetic dataset comprises utilizing an LLM to generate a plurality of inputs associated with the one or more strengths of the teacher model, wherein the synthetic dataset comprises the plurality of inputs.

17. The non-transitory computer-readable medium of claim 11, wherein the steps further comprise:

utilizing the distilled model in production for classifying inputs to a DLP system.

18. The non-transitory computer-readable medium of claim 11, wherein the steps further comprise:

receiving an input comprising data in any of a plurality of formats;

processing the input via the distilled model to classify the input into a category of a plurality of categories; and providing an indication of the category of the plurality of categories.

19. The non-transitory computer-readable medium of claim 18, wherein the steps further comprise:

processing the input to determine whether or not the data includes sensitive data prior to processing the input for classification.

20. The non-transitory computer-readable medium of claim 18, wherein the plurality of formats comprise text formats, image formats, audio formats, video formats, source code, and a combination thereof.

* * * * *